US012587420B2

(12) United States Patent (10) Patent No.: US 12,587,420 B2

Yu et al. (45) Date of Patent: Mar. 24, 2026

(54) DATA TRANSMISSION METHOD AND RELATED APPARATUS

(71) Applicant: HUAWEI TECHNOLOGIES CO., LTD., Shenzhen (CN)

(72) Inventors: Xiaopu Yu, Shenzhen (CN); Biao Wang, Beijing (CN); Xue Li, Beijing (CN); Qin Huang, Beijing (CN); Yiqun Wu, Shanghai (CN); Jiyong Pang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 132 days.

(21) Appl. No.: 18/424,051

(22) Filed: Jan. 26, 2024

(65) Prior Publication Data

US 2024/0243955 A1 Jul. 18, 2024

Related U.S. Application Data

(63) Continuation of application No. PCT/CN2022/099014, filed on Jun. 15, 2022.

(30) Foreign Application Priority Data

Jul. 29, 2021 (CN) .......................... 202110862580.5

(51) Int. Cl.
*H04L 27/20* (2006.01)

(52) U.S. Cl.
CPC .................................... *H04L 27/20* (2013.01)

(58) Field of Classification Search
CPC ..... H04L 27/20; H04L 1/0041; H04L 1/0057; H03M 13/1157; H03M 13/2906; H03M 13/2948; H03M 13/3761
See application file for complete search history.

(56) References Cited

U.S. PATENT DOCUMENTS 8,316,287 B1 * 11/2012 Varnica ................ H03M 13/116
714/801
2020/0412383 A1 * 12/2020 Ma ...................... H03M 13/1108

OTHER PUBLICATIONS

Huang Zixuan et al:"A Novel Weight Coefficient PEG Algorithm for Ultra-Reliable Short Length Analog Fountain Codes" IEEE Wireless Communications Letters,vol. 8,No. 1, Feb. 2019,XP011710587,total 4 pages.
Zhang Ke et al:"Finite Block-Length Analog Fountain Codes for Ultra-Reliable Low Latency Communications",IEEE Transactions on Communications,vol. 68,No. 3,Mar. 2020, XP011779507, total 14 pages.
Extended European Search Report issued in corresponding European Application No. 22848087.7, dated Oct. 17, 2024, pp. 1-11.

* cited by examiner

*Primary Examiner* — Vineeta S Panwalkar

(74) *Attorney, Agent, or Firm* — HAUPTMAN HAM, LLP

(57) ABSTRACT

A data transmission method and a related apparatus. A sending device performs binary phase shift keying BPSK mapping on a to-be-transmitted bit sequence to obtain a first sequence. The sending device performs coding modulation on the first sequence based on a generator matrix or a first sub-matrix including some rows of the generator matrix, to obtain a symbol sequence. The sending device sends the symbol sequence to a receiving device through a channel.

16 Claims, 7 Drawing Sheets

DATA TRANSMISSION METHOD AND RELATED APPARATUS

CROSS-REFERENCE TO RELATED APPLICATIONS

This application is a continuation of International Application No. PCT/CN2022/099014, filed on Jun. 15, 2022, which claims priority to Chinese Patent Application No. 202110862580.5, filed on Jul. 29, 2021. The disclosures of the aforementioned applications are hereby incorporated by reference in their entireties.

BACKGROUND

With development of the communication field, a delay, reliability, and the like of data transmission in various communication scenarios are increasingly high. As the most basic wireless access processing in data transmission, channel coding plays an important role in data transmission. Channel coding and modulation are usually designed separately. However, there is a specific gap between an existing uniform quadrature amplitude modulation (quadrature amplitude modulation, QAM) method and a capacity bound. The gap is especially clear in higher order modulation. Theoretically, there is a gap of 1.53 dB in an additive white Gaussian noise (additive white Gaussian noise, AWGN) channel. Coding modulation is a jointly optimized design of coding and modulation, and narrows the gap to some extent.

In the jointly optimized design of coding and modulation, analog fountain code (analog fountain code, AFC) or a similar algorithm is usually used to construct a generator matrix. An encoder and a decoder corresponding to the analog fountain code or the similar algorithm have linear complexity. An information bit is directly mapped to a modulation symbol in a rate-free manner, so that a sending device sends an infinite quantity of modulation symbols to a destination, and rate matching is more flexible.

However, in an existing solution for constructing this type of coding modulation generator matrix, problems such as non-optimization of a short cycle and non-uniform weight allocation exist. For example, in a solution of a maximum minimum variable node degree (maximum minimum variable node degree, max-min) matrix, a variable node is randomly selected under a premise of ensuring maximization of a minimum variable node degree, and generation of a short cycle cannot be avoided or reduced. For another example, in a solution of a short analog fountain code (short analog fountain code, SAFC) matrix, a variable node is randomly selected from variable nodes with currently minimum reliability. A variable node with a small connection weight is repeatedly selected, and a short cycle is easily formed. For another example, for a weight coefficient-progressive edge-growth (weight coefficient-progressive edge-growth, WC-PEG) matrix, distribution of connection edges is determined based on a PEG algorithm. The WC-PEG matrix uses different weights for a same quantity of times in each column, and weight distribution uniformity of the WC-PEG matrix is poor.

SUMMARY

Embodiments described herein disclose a data transmission method and a related apparatus, so that coding modulation transmission is implemented, and coding modulation performance is improved.

According to a first aspect, at least one embodiment discloses a data transmission method, including: performing binary phase shift keying (binary phase shift keying, BPSK) mapping on a to-be-transmitted bit sequence to obtain a first sequence; performing coding modulation on the first sequence based on a generator matrix or a first sub-matrix including some rows of the generator matrix, to obtain a symbol sequence $c_i$; and sending the symbol sequence $c_i$ to a receiving device through a channel. In this way, coding modulation transmission is implemented, and coding modulation performance is improved.

Each element in the first sequence is 1 or −1. Lengths of both the bit sequence and the first sequence are N. A length $m_i$ of the symbol sequence $c_i$ is a positive integer less than or equal to a maximum quantity M of transmission symbols. i is a transmission time of the symbol sequence. i is a positive integer less than or equal to M. A quantity of columns of the generator matrix is N. A quantity of rows of the generator matrix is M. Both M and N are positive integers.

In at least one embodiment, a location of a non-zero element in each row of the generator matrix is obtained based on a progressive edge-growth algorithm. Values of non-zero elements in each row of the generator matrix are different and each is a weight value in a weight set. A value of a non-zero element in the first row of the generator matrix is a weight value randomly allocated in the weight set. A value of a non-zero element in a row of the generator matrix other than the first row of the generator matrix is related to reference information of the non-zero element, and is in a negative correlation with an evaluation value corresponding to the reference information.

The location of the non-zero element in each row of the generator matrix is obtained based on the progressive edge-growth (progressive edge-growth, PEG) algorithm, so that generation of a short cycle is reduced, and a minimum cycle length of the generated short cycle is lengthened, to improve decoding performance. In addition, a value is assigned to the non-zero element based on an evaluation value of the non-zero element, to help implement uniform distribution of weight values in a variable node and distribution optimization of weight values on the short cycle, so that coding performance is improved.

In at least one embodiment, the method further includes: determining the generator matrix based on a value of N and/or a transmission rate. In this way, accuracy of determining the generator matrix is improved, and performance of coding and decoding is improved.

In at least one embodiment, the performing BPSK mapping on a to-be-transmitted bit sequence to obtain a first sequence includes: performing concatenated outer-code coding on the to-be-transmitted bit sequence to obtain a second sequence, where a length of the second sequence is N; and performing BPSK mapping on the second sequence to obtain the first sequence. In this way, concatenated outer-code coding is performed on the bit sequence, to improve coding performance.

In at least one embodiment, a quantity of rows of the first sub-matrix $G_i$ is equal to $m_i$. In response to i being 1, the first sub-matrix $G_i$ is a sub-matrix including first $m_i$ rows of the generator matrix, and $m_i$ is a positive integer less than M. In response to i being greater than 1, the first sub-matrix $G_i$ is a sub-matrix including the $(m_{i-1}+1)^{th}$ row to the $(m_{i-1}+m_i)^{th}$ row of the generator matrix, and $m_i$ is a positive integer less than or equal to a difference between M and $M'_{i-1}$. $M'_{i-1}$ is a sum $\Sigma_{k=1}^{i-1} m_k$ of lengths of symbol sequences transmitted for first (i−1) times. $m_{i-1}$ is a quantity of rows of a first sub-matrix $G_{i-1}$ used to perform coding modulation on a transmitted symbol sequence $c_{i-1}$ at an $(i-1)^{th}$ time, and is equal to a length of the symbol sequence $c_{i-1}$. In this way, the symbol sequence is transmitted based on the first sub-matrix, so that incremental transmission of the symbol sequence is implemented, and efficiency of coding modulation is improved.

In at least one embodiment, the method further includes: determining a value of $m_i$ and/or a value of M based on a channel parameter of the channel. In this way, a success rate of information transmission and efficiency of coding or decoding is improved.

In at least one embodiment, the method further includes: sending configuration information to the receiving device. The configuration information is used to determine parameter information of the generator matrix or parameter information of a second sub-matrix including some rows of the generator matrix. The second sub-matrix is used to perform demodulation decoding based on symbol sequences received for first i times. The parameter information of the generator matrix includes the value of N and the value of M, and the parameter information of the second sub-matrix includes the value of N and a quantity of rows of the second sub-matrix. In this way, accuracy of obtaining the matrix used for demodulation decoding is improved, and a success rate of demodulation decoding is improved.

According to a second aspect, at least one embodiment discloses another data transmission method, including: receiving a symbol sequence $y_i$ from a sending device through a channel; and performing, based on symbol sequences received for first i times, demodulation decoding by using a generator matrix or a second sub-matrix including some rows of the generator matrix, to obtain a bit sequence estimation. In this way, demodulation decoding transmission is implemented, and demodulation decoding performance is improved.

A length $m_i$ of the symbol sequence $y_i$ is a positive integer less than or equal to a maximum quantity M of transmission symbols. i is a receiving time of the received symbol sequence. i is a positive integer less than or equal to M. A length of the bit sequence estimation is a quantity N of columns of the generator matrix. A quantity of rows of the generator matrix is M. Both M and N are positive integers.

In at least one embodiment, a location of a non-zero element in each row of the generator matrix is obtained based on a progressive edge-growth algorithm. Values of non-zero elements in each row of the generator matrix are different and each is a weight value in a weight set. A value of a non-zero element in the first row of the generator matrix is a weight value randomly allocated in the weight set. A value of a non-zero element in a row of the generator matrix other than the first row of the generator matrix is related to reference information of the non-zero element, and is in a negative correlation with an evaluation value corresponding to the reference information.

The location of the non-zero element in each row of the generator matrix is obtained based on the PEG algorithm, so that generation of a short cycle is reduced, and a minimum cycle length of the generated short cycle is lengthened, to improve decoding performance. In addition, a value is assigned to the non-zero element based on an evaluation value of the non-zero element, to help implement uniform distribution of weight values in a variable node and distribution optimization of weight values on the short cycle, so that coding performance is improved.

In at least one embodiment, the performing, based on symbol sequences received for first i times, demodulation decoding by using a generator matrix or a second sub-matrix including some rows of the generator matrix, to obtain a bit sequence estimation includes: performing, based on the symbol sequences received for the first i times, demodulation decoding by using the generator matrix or the second sub-matrix including some rows of the generator matrix, to obtain first soft information, where a length of the first soft information is N; and performing outer-code decoding on the first soft information to obtain the bit sequence estimation. In this way, outer-code decoding is performed on the soft information obtained through demodulation decoding, to improve decoding accuracy.

In at least one embodiment, the performing outer-code decoding on the first soft information to obtain the bit sequence estimation includes: performing outer-code decoding on the first soft information to obtain second soft information; and performing iterative decoding based on the second soft information, to obtain the bit sequence estimation. In this way, iterative decoding is performed at least once, to further improve decoding accuracy.

In at least one embodiment, the second sub-matrix $G'_i$ is a sub-matrix including first m rows of the generator matrix. In response to i being 1, $m'_i$ is equal to $m_i$, and both $m'_i$ and $m_i$ are positive integers less than M. In response to i being greater than 1, $m_i$ is equal to a sum of $m'_{i-1}$ and $m_i$, and $m_i$ is a positive integer less than or equal to a difference between M and $M'_{i-1}$. $M'_{i-1}$ is equal to a sum $\Sigma_{k=1}^{i-1} m_k$ of lengths of symbol sequences received for first $(i-1)$ times. $m'_{i-1}$ is a quantity of rows of a second sub-matrix $G'_{i-1}$ used to perform demodulation decoding at an $(i-1)^{th}$ time based on the symbol sequences received for the first $(i-1)$ times. In this way, demodulation decoding is performed, based on all received symbol sequences, by using the second sub-matrix, so that efficiency of demodulation decoding is improved.

In at least one embodiment, before the performing, based on the symbol sequences received for the first i times, demodulation decoding by using the generator matrix or the second sub-matrix including some rows of the generator matrix, the method further includes: receiving configuration information from the sending device, where the configuration information is used to determine parameter information of the generator matrix or parameter information of the second sub-matrix, the parameter information of the generator matrix includes a value of N and a value of M, and the parameter information of the second sub-matrix includes the value of N and the quantity of rows of the second sub-matrix; and determining the parameter information based on the configuration information. In this way, a success rate of decoding is improved.

According to a third aspect, at least one embodiment discloses a communication apparatus, including: a processing unit, configured to: perform BPSK mapping on a to-be-transmitted bit sequence to obtain a first sequence; and perform coding modulation on the first sequence based on a generator matrix or a first sub-matrix including some rows of the generator matrix, to obtain a symbol sequence $c_i$; and a transceiver unit, configured to send the symbol sequence $c_i$ to a receiving device through a channel. In this way, coding modulation transmission is implemented, and coding modulation performance is improved.

Each element in the first sequence is 1 or −1. Lengths of both the bit sequence and the first sequence are N. A length $m_i$ of the symbol sequence $c_i$ is a positive integer less than or equal to a maximum quantity M of transmission symbols. i is a transmission time of the symbol sequence. i is a positive integer less than or equal to M. A quantity of columns of the generator matrix is N. A quantity of rows of the generator matrix is M. Both M and N are positive integers.

In at least one embodiment, a location of a non-zero element in each row of the generator matrix is obtained based on a progressive edge-growth algorithm. Values of non-zero elements in each row of the generator matrix are different and each are a weight value in a weight set. A value of a non-zero element in the first row of the generator matrix is a weight value randomly allocated in the weight set. A value of a non-zero element in a row of the generator matrix other than the first row of the generator matrix is related to reference information of the non-zero element, and is in a negative correlation with an evaluation value corresponding to the reference information.

The location of the non-zero element in each row of the generator matrix is obtained based on the PEG algorithm, so that generation of a short cycle is reduced, and a minimum cycle length of the generated short cycle is lengthened, to improve decoding performance. In addition, a value is assigned to the non-zero element based on an evaluation value of the non-zero element, to help implement uniform distribution of weight values in a variable node and distribution optimization of weight values on the short cycle, so that coding performance is improved.

In at least one embodiment, the processing unit is further configured to determine the generator matrix based on a value of N and/or a transmission rate. In this way, accuracy of determining the generator matrix is improved, and performance of coding and decoding is improved.

In at least one embodiment, the processing unit is specifically configured to: perform concatenated outer-code coding on the to-be-transmitted bit sequence to obtain a second sequence, where a length of the second sequence is N; and perform BPSK mapping on the second sequence to obtain the first sequence. In this way, concatenated outer-code coding is performed on the bit sequence, to improve coding performance.

In at least one embodiment, a quantity of rows of the first sub-matrix $G_i$ is equal to $m_i$. In response to i being 1, the first sub-matrix $G_i$ is a sub-matrix including first $m_i$ rows of the generator matrix, and $m_i$ is a positive integer less than M. In response to i being greater than 1, the first sub-matrix $G_i$ is a sub-matrix including the $(m_{i-1}+1)^{th}$ row to the $(m_{i-1}+m_i)^{th}$ row of the generator matrix, and $m_i$ is a positive integer less than or equal to a difference between M and $M'_{i-1}$. $M'_{i-1}$ is a sum $\varepsilon_{k=1}^{i-1} m_k$ of lengths of symbol sequences transmitted for first (i−1) times. $m_{i-1}$ is a quantity of rows of a first sub-matrix $G_{i-1}$ used to perform coding modulation on a transmitted symbol sequence $c_{i-1}$ at an $(i-1)^{th}$ time, and is equal to a length of the symbol sequence $c_{i-1}$. In this way, the symbol sequence is transmitted based on the first sub-matrix, so that incremental transmission of the symbol sequence is implemented, and efficiency of coding modulation is improved.

In at least one embodiment, the processing unit is further configured to determine a value of $m_i$ and/or a value of M based on a channel parameter of the channel. In this way, a success rate of information transmission and efficiency of coding or decoding is improved.

In at least one embodiment, the transceiver unit is configured to send configuration information to the receiving device. The configuration information is used to determine parameter information of the generator matrix or parameter information of a second sub-matrix including some rows of the generator matrix. The second sub-matrix is used to perform demodulation decoding based on symbol sequences received for first i times. The parameter information of the generator matrix includes the value of N and the value of M, and the parameter information of the second sub-matrix includes the value of N and a quantity of rows of the second sub-matrix. In this way, accuracy of obtaining the matrix used for demodulation decoding is improved, and a success rate of demodulation decoding is improved.

According to a fourth aspect, at least one embodiment discloses another communication apparatus, including: a transceiver unit, configured to receive a symbol sequence from a sending device through a channel; and a processing unit, configured to perform, based on symbol sequences received for first i times, demodulation decoding by using a generator matrix or a second sub-matrix including some rows of the generator matrix, to obtain a bit sequence estimation. In this way, demodulation decoding transmission is implemented, and demodulation decoding performance is improved.

A length $m_i$ of the symbol sequence $y_i$ is a positive integer less than or equal to a maximum quantity M of transmission symbols. i is a quantity of receiving times of the received symbol sequence. i is a positive integer less than or equal to M. A length of the bit sequence estimation is a quantity N of columns of the generator matrix. A quantity of rows of the generator matrix is M. Both M and N are positive integers.

In at least one embodiment, a location of a non-zero element in each row of the generator matrix is obtained based on a progressive edge-growth algorithm. Values of non-zero elements in each row of the generator matrix are different and each are a weight value in a weight set. A value of a non-zero element in the first row of the generator matrix is a weight value randomly allocated in the weight set. A value of a non-zero element in a row of the generator matrix other than the first row of the generator matrix is related to reference information of the non-zero element, and is in a negative correlation with an evaluation value corresponding to the reference information.

The location of the non-zero element in each row of the generator matrix is obtained based on the PEG algorithm, so that generator of short cycles is reduced, and a minimum cycle length of the generated short cycle is lengthened, to improve decoding performance. In addition, a value is assigned to the non-zero element based on an evaluation value of the non-zero element, to help implement uniform distribution of weight values in a variable node and distribution optimization of weight values on the short cycle, so that coding performance is improved.

In at least one embodiment, the processing unit is specifically configured to: perform, based on the symbol sequences received for the first i times, demodulation decoding by using the generator matrix or the second sub-matrix including some rows of the generator matrix, to obtain first soft information, where a length of the first soft information is N; and perform outer-code decoding on the first soft information to obtain the bit sequence estimation. In this way, outer-code decoding is performed on the soft information obtained through demodulation decoding, to improve decoding accuracy.

In at least one embodiment of the foregoing example, the processing unit is specifically configured to: perform outer-code decoding on the first soft information to obtain second soft information; and perform iterative decoding based on the second soft information, to obtain a bit sequence estimation. In this way, iterative decoding is performed at least once, to further improve decoding accuracy.

In at least one embodiment, the second sub-matrix $G'_i$ is a sub-matrix including first $m'_i$ rows of the generator matrix.

In response to i being 1, $m'_i$ is equal to $m_i$, and both $m'_i$ and $m_i$ are positive integers less than M. In response to i being greater than 1, $m'_i$ is equal to a sum of $m'_{i-1}$ and $m_i$, and $m_i$ is a positive integer less than or equal to a difference between M and $Mt'_{i-1}$. $M'_{i-1}$ is equal to a sum $\varepsilon_{k=1}^{i-1} m_k$ of lengths of symbol sequences received for first (i-1) times. $m'_{i-1}$ is a quantity of rows of a second sub-matrix $G'_{i-1}$ used to perform demodulation decoding at an $(i-1)^{th}$ time based on the symbol sequences received for the first (i-1) times. In this way, demodulation decoding is performed, based on all received symbol sequences, by using the second sub-matrix, so that efficiency of demodulation decoding is improved.

In at least one embodiment, the transceiver unit is further configured to receive configuration information from the sending device. The configuration information is used to determine parameter information of the generator matrix or parameter information of the second sub-matrix. The parameter information of the generator matrix includes a value of N and a value of M. The parameter information of the second sub-matrix includes the value of N and the quantity of rows of the second sub-matrix. The processing unit is further configured to determine the parameter information based on the configuration information. In this way, a success rate of decoding is improved.

With reference to the first aspect, the second aspect, the third aspect, and the fourth aspect, in at least one embodiment, the reference information of the non-zero element includes a quantity of other non-zero elements, and/or values of the other non-zero elements, and/or a determined sequence number of a location of the non-zero element. Column sequence numbers of the other non-zero elements are the same as a column sequence number of the non-zero element. Row sequence numbers of the other non-zero elements are smaller than a row sequence number of the non-zero element.

With reference to the first aspect, the second aspect, the third aspect, and the fourth aspect, in at least one embodiment, the evaluation value is equal to the quantity of other non-zero elements, or a sum of squares of the values of the other non-zero elements, or the determined sequence number.

The evaluation value determined based on the reference information such as the quantity of other non-zero elements, and/or the values of the other non-zero elements, and/or the determined sequence number of the location of the non-zero element is used to further improve the uniform distribution of the weight values in the variable node and the distribution optimization of the weight values on the short cycle. This helps further improve the coding performance.

With reference to the first aspect, the second aspect, the third aspect, and the fourth aspect, in at least one embodiment, a quantity of non-zero elements in each row of the generator matrix are a quantity d of weight values in the weight set. In this way, a transmission rate and efficiency of coding modulation is improved.

With reference to the first aspect, the second aspect, the third aspect, and the fourth aspect, in at least one embodiment, the generator matrix includes P circulant permutation matrix groups. The circulant permutation matrix group includes d circulant permutation sub-matrices. A quantity of rows of the circulant permutation sub-matrix is equal to a quantity of columns of the circulant permutation sub-matrix and is equal to a first ratio of N to d. P is equal to a second ratio of M to the first ratio. Each row of the circulant permutation sub-matrix has a non-zero element. A location of a non-zero element in the first row of the circulant permutation matrix group is obtained based on the progressive edge-growth algorithm. A location of a non-zero element in a row of the circulant permutation sub-matrix other than the first row of the circulant permutation sub-matrix is obtained by performing cyclic shift based on a previous row of the row.

In response to the quantity of non-zero elements in each row of the generator matrix being equal to the quantity d of the weight values in the weight set, an element is selected from the circulant permutation sub-matrix in each row of the generator matrix as a non-zero element, so that locations of the non-zero elements are uniformly allocated, and the transmission rate and efficiency of coding modulation is improved. The location of the non-zero element in the first row of the circulant permutation matrix group is obtained based on the PEG algorithm. The location of the non-zero element in the row of the circulant permutation sub-matrix other than the first row of the circulant permutation sub-matrix is obtained by performing cyclic shift based on the previous row of the row. In this way, after the location of the non-zero element in the first row is determined, the location of the non-zero element in the row other than the first row of the circulant permutation matrix group is determined. In addition, the cyclic shift enables the non-zero elements in a same circulant permutation sub-matrix to be in different columns, so that the locations of the non-zero elements are uniformly allocated, to help implement uniform distribution of variable node degrees and distribution optimization of the weight values on the short cycle.

With reference to the first aspect, the second aspect, the third aspect, and the fourth aspect, in at least one embodiment, the reference information of the non-zero element includes values of other non-zero elements, and/or a determined sequence number of a location of the non-zero element. Column sequence numbers of the other non-zero elements are the same as a column sequence number of the non-zero element. Row sequence numbers of the other non-zero elements are smaller than a row sequence number of the non-zero element.

With reference to the first aspect, the second aspect, the third aspect, and the fourth aspect, in at least one embodiment, the evaluation value is equal to a sum of squares of the values of the other non-zero elements, or the determined sequence number.

The evaluation value determined based on the reference information such as the values of the other non-zero elements and/or the determined sequence number of the location of the non-zero element is used to further improve the uniform distribution of the weight values in the variable node and the distribution optimization of the weight values on the short cycle. This helps further improve the coding performance.

With reference to the first aspect, the second aspect, the third aspect, and the fourth aspect, in at least one embodiment, values of non-zero elements in the circulant permutation sub-matrix are equal. In this way, the value of the non-zero element in the matrix or a value of a non-zero element in a circulant permutation sub-matrix below the row is determined by using a circulant permutation sub-matrix as a unit, to further improve coding performance.

According to a fifth aspect, at least one embodiment discloses a communication apparatus, including a processor, and a memory and a communication interface that are connected to the processor. The memory is configured to store one or more programs, and the processor is configured to perform the steps according to any one of the foregoing aspects.

According to a sixth aspect, at least one embodiment discloses a computer-readable storage medium. The computer-readable storage medium stores instructions. In response to the instructions being run on a computer, the computer is enabled to perform the method according to any one of the foregoing aspects.

According to a seventh aspect, at least one embodiment discloses a computer program product. The computer program product is configured to store a computer program; and in response to the computer program being run on a computer, the computer is enabled to perform the method according to any one of the foregoing aspects.

According to an eighth aspect, at least one embodiment discloses a first type of chip, including a processor and a memory. The processor is configured to invoke instructions from the memory, and run the instructions stored in the memory, to enable a device in which the chip is installed to perform the method according to any one of the foregoing aspects.

According to a ninth aspect, at least one embodiment discloses a second type of chip, including an input interface, an output interface, and a processing circuit. The input interface, the output interface, and the processing circuit are connected to each other through an internal connection path. The processing circuit is configured to perform the method according to any one of the foregoing aspects.

According to a tenth aspect, at least one embodiment discloses a third type of chip, including an input interface, an output interface, a processor, and optionally, a memory. The input interface, the output interface, the processor, and the memory are connected to each other through an internal connection path. The processor is configured to execute code in the memory. In response to the code being executed, the processor is configured to perform the method according to any of the foregoing aspects.

According to an eleventh aspect, at least one embodiment discloses a chip system, including at least one processor, a memory, and an interface circuit. The memory, a transceiver, and the at least one processor are connected to each other through lines. At least one memory stores a computer program, and the computer program is used by the processor to perform the method according to any one of the foregoing aspects.

BRIEF DESCRIPTION OF DRAWINGS

The following describes accompanying drawings used in at least one embodiment.

DESCRIPTION OF EMBODIMENTS

The following describes at least one embodiment with reference to the accompanying drawings.

Figure 1:
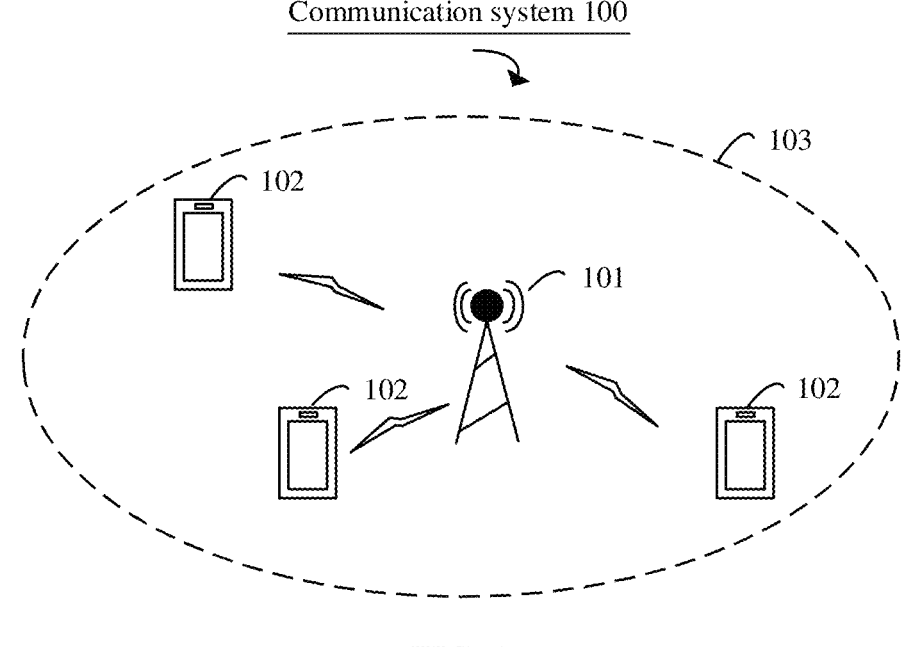
FIG. 1 is a framework diagram of a structure of a communication system according to at least one embodiment.

FIG. 1 is a schematic diagram of a structure of a communication system according to at least one embodiment. The communication system 100 includes at least one network device 101 (only one network device 101 is shown in FIG. 1) and at least one terminal device 102 connected to the network device 101. The network device 101 performs wireless communication with the terminal device 102 by using one or more antennas. Each network device 101 provides communication coverage for a coverage area 103 corresponding to the network device 101. The coverage area 103 corresponding to the network device 101 is divided into a plurality of sectors (sectors). Each sector corresponds to a part of the coverage area (not shown in FIG. 1). In response to the communication system 100 including a core network, the network device 101 is also connected to the core network.

In at least one embodiment, the terminal device is a device having a wireless transceiver function. The terminal device is deployed on land, where the deployment includes indoor or outdoor, wearable, handheld or vehicle-mounted deployment. The terminal device is further deployed on a water surface (for example, on a ship) or in air (for example, on an airplane, a balloon, or a satellite). The terminal device is a mobile phone (mobile phone), a tablet computer (Pad), a computer with a wireless transceiver function, a virtual reality (Virtual Reality, VR) terminal device, an augmented reality (Augmented Reality, AR) terminal device, a wireless terminal in industrial control (industrial control), a wireless terminal in self-driving (self-driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), and the like.

An application scenario is not limited in at least one embodiment. The terminal device is sometimes referred to as user equipment (user equipment, UE), a terminal (terminal), an access terminal, a UE unit, a UE station, a mobile device, a mobile console, a mobile station (mobile station), a mobile terminal, a mobile client, a mobile unit (mobile unit), a remote station, a remote terminal device, a remote unit, a wireless unit, a wireless communication device, a user agent, a user apparatus, or the like.

Figure 2:
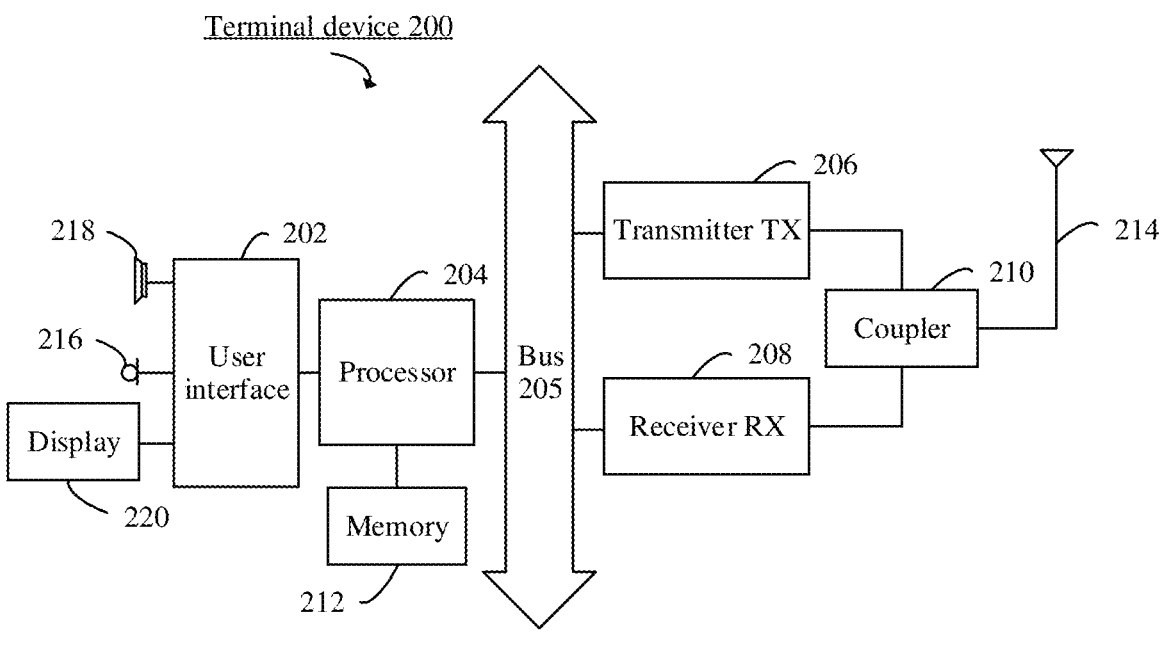
FIG. 2 is a framework diagram of a structure of a terminal device according to at least one embodiment.

FIG. 2 is a schematic diagram of a structure of a terminal device according to at least one embodiment. The terminal device 200 in FIG. 2 is the terminal device 102 in the communication system 100 shown in FIG. 1. As shown in FIG. 2, the terminal device 200 includes input/output modules (including an audio input/output module 218, a key input module 216, a display 220, and the like), a user interface 202, one or more processors 204, a transmitter (transmit, TX) 206, a receiver (receive, RX) 208, a coupler 210, an antenna 214, and a memory 212. These components are connected through a bus or in other manners. In FIG. 2, an example is used in which a bus 205 is used for connection. The antenna 214 is configured to convert electromagnetic energy into an electromagnetic wave in free space, or convert an electromagnetic wave in free space into electromagnetic energy in a transmission line.

The coupler 210 is configured to divide a mobile communication signal received by the antenna 214 into a plurality of signals and allocate the plurality of signals to a plurality of receivers 208.

The transmitter 206 is configured to perform transmission processing on a signal output by the processor 204.

The receiver 208 is configured to perform receiving processing on the mobile communication signal received by the antenna 214.

In at least one embodiment, the transmitter 206 and the receiver 208 is considered as a wireless modem. In the terminal device 200, there is one or more transmitters 206 and one or more receivers 208.

In addition to the transmitter 206 and the receiver 208 shown in FIG. 2, the terminal device 200 further includes another communication component, for example, a GPS module, a Bluetooth (Bluetooth) module, or a wireless fidelity (wireless fidelity, Wi-Fi) module. In addition to the foregoing wireless communication signals, the terminal device 200 further supports other wireless communication signals, for example, a satellite signal and a short-wave signal. Without being limited to wireless communication, the terminal device 200 is further configured with a wired network interface (for example, a local area network (local area network, LAN) interface) 201 to support wired communication.

The input/output module is configured to implement interaction between the terminal device 200 and a user/an external environment, and mainly includes the audio input/output module 218, the key input module 216, the display 220, and the like. The input/output module further includes a camera, a touchscreen, a sensor, and the like. The input/output module communicates with the processor 204 through the user interface 202.

The memory 212 is coupled to the processor 204 through the bus or an input/output port, or the memory 212 is integrated with the processor 204. The memory 212 is configured to store various software programs and/or a plurality of groups of instructions. The memory 212 includes a high-speed random access memory, or a non-volatile memory, for example, one or more disk storage devices, a flash memory device, or another non-volatile solid-state storage device. The memory 212 stores an operating system (referred to as a system below), for example, an embedded operating system such as ANDROID, iOS, WINDOWS, or LINUX. The memory 212 further stores a network communication program, and the network communication program is configured to communicate with one or more additional devices, one or more terminal devices, and one or more network devices. The memory 212 further stores a user interface program. The user interface program uses a graphical operation interface to visually display content of an application program, or uses input controls such as a menu, a dialog box, and a key to receive a control operation of a user on an application program. In at least one embodiment, the memory 212 is configured to store a program for implementing, on the terminal device 200 side, a data transmission method provided in at least one embodiment.

The processor 204 is configured to read and execute computer-readable instructions. Specifically, the processor 204 is configured to invoke the program stored in the memory 212, for example, the program for implementing, on the terminal device 200 side, the data transmission method provided in at least one embodiment, and execute instructions included in the program to implement the method in the following embodiments. The processor 204 supports one or more communication technologies of global system for mobile communication (global system for mobile communication, GSM) communication (or referred to as 2G communication), wideband code division multiple access (wideband code division multiple access, WCDMA) communication (or referred to as 3G communication), long term evolution (long term evolution, LTE) communication (or referred to as 4G communication), new radio (new radio, NR) communication (or referred to as 5G communication), and the like. Optionally, in response to the processor 204 sending any message or data, the processor 204 specifically drives or controls the transmitter 206 to send the message or data. Optionally, in response to the processor 204 receiving any message or data, the processor 204 specifically drives or controls the receiver 208 to receive the message or data. Therefore, the processor 204 is considered as a control center for performing sending or receiving. The transmitter 206 and the receiver 208 are specific executors of sending and receiving operations.

The terminal device 200 shown in FIG. 2 is merely an implementation of at least one embodiment. In actual application, the terminal device 200 alternatively includes more or fewer components. This is not limited herein.

In at least one embodiment, the network device is a device that supports the terminal device in accessing a communication system, or is a chip disposed in the device. The network device is an evolved NodeB (evolved NodeB, eNB), a base transceiver station (base transceiver station, BTS), a home base station (for example, a home evolved NodeB or a home NodeB, HNB), a baseband unit (baseband unit, BBU), an access point (access point, AP) in a wireless fidelity (wireless fidelity, Wi-Fi) system, a wireless relay node, a wireless backhaul node, a transmission point (transmission and reception point, TRP, or transmission point, TP), or the like. Alternatively, the network device is a gNB, a transmission point (TRP or TP), or the like in a 5G system, one antenna panel or a group of antenna panels (including a plurality of antenna panels) in a base station in the 5G system, a network node included in a gNB or a transmission point, for example, a BBU, or a distributed unit (distributed unit, DU). This is not limited herein.

Figure 3:
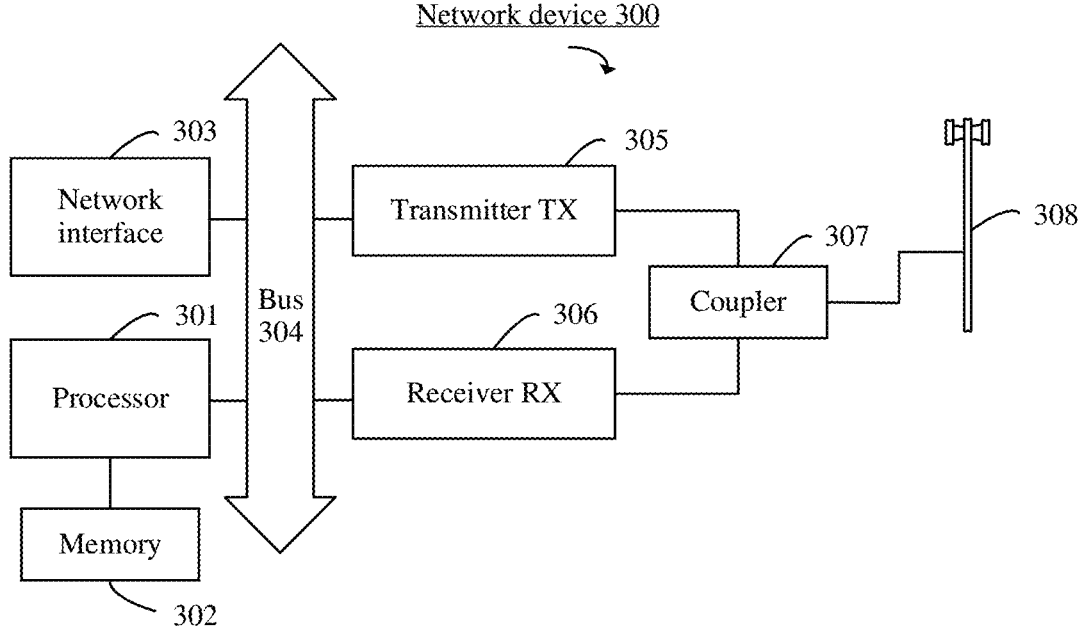
FIG. 3 is a schematic diagram of a structure of a network device according to at least one embodiment.

FIG. 3 is a schematic diagram of a structure of a network device according to at least one embodiment. The network device 300 in FIG. 3 is the network device 101 in the communication system 100 shown in FIG. 1. As shown in FIG. 3, the network device 300 includes one or more processors 301, a memory 302, a network interface 303, a transmitter 305, a receiver 306, a coupler 307, and an antenna 308. The components are connected by using a bus 304 or in another manner, and in FIG. 3, a bus connection is used as an example. The network interface 303 is used by the network device 300 to communicate with another communication device (such as another network device).

Specifically, the network interface 303 is a wired interface.

The transmitter 305 is configured to perform transmission processing such as signal modulation on a signal output by the processor 301. The receiver 306 is configured to perform receiving processing such as signal demodulation on a mobile communication signal received by the antenna 308. In at least one embodiment, the transmitter 305 and the receiver 306 are considered as a wireless modem. In the network device 300, there is one or more transmitters 305 and one or more receivers 306. The antenna 308 is configured to convert electromagnetic energy in a transmission line into an electromagnetic wave in free space, or convert an electromagnetic wave in free space into electromagnetic energy in a transmission line. The coupler 307 is configured to divide the mobile communication signal into a plurality of signals and allocate the plurality of signals to a plurality of receivers 306.

The memory 302 is coupled to the processor 301 through the bus 304 or an input/output port, or the memory 302 is integrated with the processor 301. The memory 302 is configured to store various software programs and/or a plurality of groups of instructions. Specifically, the memory 302 includes a high-speed random access memory, or a non-volatile memory, for example, one or more disk storage devices, a flash memory device, or another non-volatile solid-state storage device. The memory 302 stores an operating system (referred to as a system below), for example, an embedded operating system such as uCOS, VxWorks, or RTLinux. The memory 302 further stores a network communication program, and the network communication program is configured to communicate with one or more additional devices, one or more terminal devices, and one or more network devices.

The processor 301 is configured to manage radio channels, establish or tear down a call or communication link, and provide cell handover control and the like for a user in a local control area. Specifically, the processor 301 includes: an administration module/communication module (administration module/communication module, AM/CM) configured for a center of speech path switching and information switching, a basic module (basic module, BM) configured to complete functions of call processing, signaling processing, radio resource management, radio link management, and circuit maintenance, a transcoder and sub-multiplexer (transcoder and sub-multiplexer, TCSM) configured to complete functions of multiplexing, demultiplexing and transcoding, and the like.

In at least one embodiment, the processor 301 is configured to read and execute computer-readable instructions. Specifically, the processor 301 is configured to invoke the program stored in the memory 302, for example, a program for implementing, on the network device 300 side, a data transmission method provided in at least one embodiment, and execute instructions included in the program.

The network device 300 shown in FIG. 3 is merely an implementation of at least one embodiment, and in actual application, the network device 300 further includes more or fewer components. This is not limited herein.

Terms "system" and "network" are used interchangeably in at least one embodiment. "A plurality of" means two or more than two. In view of this, "a plurality of" is also understood as "at least two" in at least one embodiment. The term "and/or" describes an association relationship between associated objects and indicates that three relationships exist. For example, A and/or B indicate the following three cases: Only A exists, both A and B exist, and only B exists, where A and B is singular or plural. In addition, the character "/", unless otherwise specified, usually indicates an "or" relationship between the associated objects.

A receiving device described in the following embodiments is the foregoing terminal device, and a sending device is the foregoing network device. Alternatively, a receiving device described in the following embodiments is the foregoing network device, and a sending device is the foregoing terminal device. In response to the network device or the terminal device sending data, a data transmission method described in at least one embodiment is used. For implementation of the data transmission method provided in at least one embodiment, refer to the following embodiments.

The following describes some terms in at least one embodiment, to facilitate understanding of a person skilled in the art.

A generator matrix is a representation manner of linear code, and is used for coding and decoding. In the generator matrix, each row corresponds to a check node (check node, CN), and each column corresponds to a variable node (variable node, VN). A non-zero element is an element that is in the matrix and whose value of an element is not 0. In the generator matrix, a value of the non-zero element and a location of the non-zero element affect coding and decoding effect. In response to there being a non-zero element, an edge connection exists between a variable node and a check node that corresponds to a location of the non-zero element. A check node degree is defined as a quantity (or referred to as a quantity) of non-zero elements in a row corresponding to the check node. A variable node degree is defined as a quantity of non-zero elements in a column corresponding to the variable node.

For an example, refer to the following matrix A. As shown in the matrix A, the matrix A is a 4*12 matrix. There are 12 variable nodes and 6 check nodes. A value of an element in a location corresponding to the fourth row and the third column is 1, that is, a non-zero element, which indicates that an edge connection exists between a check node corresponding to the fourth row and a variable node corresponding to the third column. In response to a value of an element in a location corresponding to the second row and the fifth column being 0, no edge connection exists between a check node corresponding to the second row and a variable node corresponding to the fifth column.

$$A = \begin{pmatrix} 1 & 0 & 0 & 0 & 1 & 0 & 1 & 0 & 0 & 0 & 0 & 1 \\ 0 & 0 & 1 & 1 & 0 & 0 & 0 & 1 & 0 & 0 & 1 & 0 \\ 0 & 1 & 0 & 0 & 0 & 1 & 0 & 0 & 1 & 1 & 0 & 0 \\ 1 & 0 & 1 & 0 & 1 & 0 & 0 & 0 & 0 & 1 & 0 & 0 \end{pmatrix}$$

In at least one embodiment, a degree of an element corresponding to the $i^{th}$ row and the $j^{th}$ column is defined as a quantity of non-zero elements in the $j^{th}$ column before the $i^{th}$ row. Reliability of the element corresponding to the $i^{th}$ row and the $j^{th}$ column is defined as a sum of squares of values of the non-zero elements in the $j^{th}$ column before the $i^{th}$ row. A non-zero element at a location corresponding to the fourth row and the third column in the matrix A shown above is used as an example for description. An element corresponding to the first row and the third column is denoted as $A_{1,3}$. An element corresponding to the second row and the third column is denoted as $A_{2,3}$. An element corresponding to the third row and the third column is denoted as $A_{3,3}$. An element corresponding to the fourth row and the third column is denoted as $A_{4,3}$. Because values of $A_{1,3}$ and $A_{3,3}$ are both 0. A value of $A_{2,3}$ is 1. A quantity of non-zero elements in the third column before the fourth row is 1. In other words, a degree of $A_{4,3}$ is 1, and reliability of $A_{4,3}$ is 1.

The check node and the variable node in the generator matrix is drawn into a bipartite graph based on a connection relationship between the check node and variable node. In the bipartite graph, an edge between the check node and the variable node corresponds to the location of the non-zero element in the generator matrix. The check node degree and the variable node degree respectively correspond to a quantity of edges connected to the check node and a quantity of edges connected to the variable node. A value on the edge between the check node and the variable node indicates values of non-zero elements corresponding to the check node and the variable node.

Figure 4:
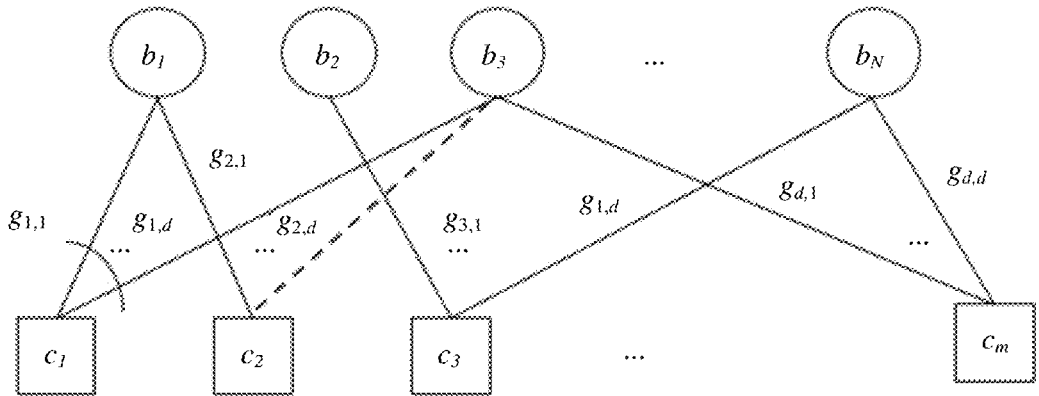
FIG. 4 is a bipartite graph of a generator matrix according to at least one embodiment.

For example, FIG. 4 is a bipartite graph of a generator matrix according to at least one embodiment. A generator matrix in FIG. 4 is a matrix of m*N. A circle represents a variable node. $b_1$, $b_2$, $b_3$, . . . , and $b_N$ respectively represent a variable node corresponding to the first column, a variable node corresponding to the second column, a variable node corresponding to the third column, . . . , and a variable node corresponding to the $N^{th}$ column in the generator matrix. A square represents a check node, that is, a coded symbol. $c_1$, $c_2$, $c_3$, . . . , and cm respectively represent a check node corresponding to the first row, a check node corresponding to the second row, a check node corresponding to the third row, . . . , and a check node corresponding to the $m^{th}$ row in the generator matrix. An edge between the check node and the variable node corresponds to a location of a non-zero element in the generator matrix. A check node degree and a variable node degree respectively correspond to a quantity of edges connected to the check node and a quantity of edges connected to the variable node. There is a connection line between $b_1$ and $c_i$ in the generator matrix shown in FIG. 4. An element in the first row and the first column is a non-zero element, and a value of the element is a value on an edge between $b_1$ and $c_1$, that is, $g_{1,1}$. There is no connection line between $b_1$ and $c_3$. An element in the first row and the third column is 0.

In at least one embodiment, a value of the non-zero element in the generator matrix is selected from weight values in a preset weight set, and a non-zero element in each row is unequal to another non-zero element in the row. The weight set is not limited in at least one embodiment. The weight set is an existing set W in a conventional technology, for example, W={½, ⅓, ⅕, ⅐, 1/11, 1/13, 1/17, 1/19 }.

The weight values are all real numbers, and are data obtained through some optimization design. For example, the weight value in the weight set enables an output symbol to satisfy Gaussian distribution and the like. A quantity of elements in the weight set is understood as a quantity of the weight values. The quantity of the weight values is denoted as d. A value of d is selected based on an actual usage, and is usually 8. In response to d=8, a rate usage within a large signal-to-noise ratio (signal-to-noise ratio, SNR) range is satisfied.

A short cycle indicates that the variable node starts from a connection edge connected to the variable node and returns to the variable node through a short connection edge. A length (or referred to as a cycle length) of the short cycle is not limited in at least one embodiment. As shown in FIG. 4, a connection line between $b_1$, $c_1$, and $b_3$ forms a cycle with a length of 4, and the cycle is referred to as a cycle 4. The cycle 4 is a short cycle with a shortest cycle length. From a perspective of a decoding algorithm, a premise of assumption is that information transmitted in an iterative process is independent. In response to there being a short cycle, independence will be damaged, and decoding performance will be affected. Therefore, in order to improve decoding performance of the generator matrix, a quantity of short cycles in the generator matrix is to be reduced. To be specific, in response to the generator matrix being constructed, generation of the short cycle is avoided, or a minimum cycle length of the short cycle is to be made large.

A progressive edge-growth (progressive edge-growth, PEG) algorithm is used to add a connection edge between the check node and variable node. In other words, the PEG algorithm is used to determine the location of the non-zero element in the generator matrix. Based on the PEG algorithm, no cycle or a minimum number cycles are formed between an edge that is newly added and an edge that has been added, so that a cycle length of a minimum cycle between the edge that is newly added and the edge that has been added is large. The first selected edge in the check node is referred to as the first edge in the check node, and is understood as a location of the first determined non-zero element in a row corresponding to the check node. Edges in the check node except the first selected edge is referred to as other edges in the check node, and is understood as a location of a non-zero element determined after the location of the first non-zero element is determined in the row corresponding to the check node. Specifically, the first edge in each check node is randomly (or randomly) selected based on a variable node with a currently minimum degree. In other edges of the check node, in response to one or more variable nodes in the edge that has been added so far not being able to connect to the check node, the edge that is newly added is to be connected to these variable nodes to avoid generation of a cycle. In response to all variable nodes in the edge that has been added so far being connected to the check node through some edges, the edge that is newly added should be connected to a variable node with the smallest degree, and a minimum cycle length between the variable node and the check node is the largest. In this way, generation of the short cycle is reduced, and the minimum cycle length of the generated short cycle is increased, to improve decoding performance.

An example is used for description. The generator matrix is a 4*12 matrix, and a check node degree is d=4. In this case, each row has four edges. Other edges include a second edge, a third edge, and a fourth edge. The second edge, the third edge, and the fourth edge are edges added at the second time, the third time, and the fourth time respectively. First, a matrix initialized to all-zero is constructed. In response to a degree of each element in the first row being 0, the first edge in the first row is randomly selected from the variable node with the currently minimum degree. As shown in a matrix A, the first edge in the first row is an edge corresponding to the first row and the first column. Currently, there is no edge that has been added except the first edge in the first row. Other edge in the first row is randomly selected. As shown in the matrix A, other edges in the first row are edges that are in the first row and that correspond to the fifth column, the seventh column, and the twelfth column.

In the second row, degrees of all columns except the first column, the fifth column, the seventh column, and the twelfth column are 0. The first edge in the second row is randomly selected from the variable node with the currently minimum degree (the degree is 0), that is, randomly selected from the second column, the third column, the fourth column, the sixth column, the eighth column, the ninth column, the tenth column, and the eleventh column. As shown in the matrix A, the first edge in the second row is an edge corresponding to the second row and the fourth column. The edges that have been added so far are the four edges in the first row and the first edge in the second row.

In order that a variable node corresponding to the currently added edge cannot be connected to a check node corresponding to the second row, other edges in the second row is randomly selected from variable nodes except a variable node (that is, column sequence numbers except column sequence numbers 1, 5, 7, 12, and 4) corresponding to the edge that has been added so far. As shown in the matrix A, other edges in the second row are edges that are in the second row and that correspond to the third column, the eighth column, and the eleventh column.

In the third row, degrees of all columns except the first column, the fifth column, the seventh column, the twelfth column, the third column, the fourth column, the eighth column, and the eleventh column are 0. The first edge in the third row is randomly selected from the variable node with the currently minimum degree (the degree is 0), that is, randomly selected from the second column, the sixth column, the ninth column, and the tenth column. As shown in the matrix A, the first edge in the third row is an edge corresponding to the third row and the ninth column. The edges that have been added so far are four edges in the first row and four edges in the second row and the first edge in the third row. In order that a variable node corresponding to the currently added edge cannot be connected to a check node corresponding to the third row, other edges in the third row is randomly selected from variable nodes except a variable node (that is, column sequence numbers except column sequence numbers 1, 5, 7, 12, 4, 3, 8, 11, and 9) corresponding to the edge that has been added so far. As shown in the matrix A, other edges in the third row are variable nodes that are not allocated with edges, that is, edges that are in the third row and that correspond to the second column, the sixth column, and the tenth column.

In response to a degree of each element in the fourth row being 1, the first edge in the fourth row is randomly selected from the variable node with the currently minimum degree (the degree is 1). As shown in the matrix A, the first edge in the fourth row is an edge corresponding to the fourth row and the third column. The currently added edges are the four edges separately added in the first row, the second row, and the third row, and the first edge added in the fourth row. Because the variable node in the third column is also connected to the second row, and the second row is also connected to the fourth column, the eighth column, and the eleventh column, in order that the variable node corresponding to the edge that has been added so far cannot be connected to a check node corresponding to the fourth row, the second edge in the fourth row is an edge randomly selected from variable nodes except variable nodes (that is, column sequence numbers except column sequence numbers 3, 4, 8, and 11) that is connected to an edge corresponding to the fourth row and the third column to form a cycle. As shown in the matrix A, the second edge in the fourth row is an edge corresponding to the fourth row and the first column.

An edge corresponding to the fourth row and the first column is added to the currently added edge. The first column is further connected to the first row, and the first row is further connected to the fifth column, the seventh column, and the twelfth column. In order that the variable node corresponding to the currently added edge cannot be connected to a check node corresponding to the fourth row, the third edge in the fourth row is an edge randomly selected from variable nodes except variable nodes (that is, column sequence numbers except column sequence numbers 3, 4, 8, 11, 1, 5, 7, and 12) that is connected to an edge corresponding to the fourth row and the third column and an edge corresponding to the first column and the fourth row to form a cycle. As shown in the matrix A, the third edge in the fourth row is an edge corresponding to the fourth row and the tenth column.

An edge corresponding to the fourth row and the tenth column is added to the currently added edge. The tenth column is further connected to the third row, and the third row is further connected to the second column, the sixth column, and the ninth column. The variable node corresponding to the edge that has been added so far returns to the check node corresponding to the fourth row by using any to-be-added edge (an edge corresponding to the fourth row and a column sequence number 2, 4, 5, 6, 8, 9, or 12). In response to each minimum cycle length being 4 and each degree is 1, any one of edges that are not added to the fourth row is selected as the fourth edge of the fourth row. As shown in the matrix A, the fourth edge in the fourth row is an edge corresponding to the fourth row and the fifth column.

In at least one embodiment, a location of a non-zero element in each row of the generator matrix G is obtained based on the PEG algorithm. In this way, generation of a short cycle is reduced, to improve decoding performance.

In at least one embodiment, values of non-zero elements in each row of the generator matrix G are different and each are a weight value in a weight set. In other words, the non-zero element in each row of the generator matrix G is a weight value in the weight set, and is different from a value of another non-zero element in the row. In this way, decoding complexity is reduced.

In at least one embodiment, a value of a non-zero element in the first row of the generator matrix G is a weight value randomly allocated in a weight set W. For example, the weight set W={1,2,4,8}, the first row of the matrix A shown above is assigned values in 18 arrangement forms such as {2,0,0,0,1,0,4,0,0,0,0,8}, {4,0,0,0,2,0,1,0,0,0,0,8}, or {1,0,0,0,4,0,8,0,0,0,0,2}.

In at least one embodiment, a row of the generator matrix G other than the first row of the generator matrix G is referred to as another row. A value of a non-zero element in another row is related to reference information of the non-zero element, and is in a negative correlation with an evaluation value corresponding to the reference information. In other words, a larger evaluation value corresponding to the reference information of the non-zero element indicates a smaller value of the non-zero element. For example, the weight set W={1,2,4,8}, and in response to the evaluation value corresponding to the reference information of the non-zero element in the fourth row of the matrix A shown above being sorted in ascending order of column sequence numbers as {2,5,6,1}, the fourth row of the matrix A is {4,0,2,0,1,0,0,0,0,8,0,0}. A value is assigned to the non-zero element based on an evaluation value of the non-zero element, to help implement uniform distribution of weight values in a variable node and distribution optimization of weight values on the short cycle, so that coding performance is improved.

The reference information of the non-zero element and a method for calculating the evaluation value are not limited in at least one embodiment. The reference information of the non-zero element includes one or more of a quantity of other non-zero elements, values of the other non-zero elements, a determined sequence number of a location of the non-zero element, and the like. The evaluation value is the quantity of other non-zero elements, the values of the other non-zero elements, the determined sequence number of the location of the non-zero element, a sum of squares of the values of the other non-zero elements, or the like.

In at least one embodiment, column sequence numbers of the other non-zero elements are the same as a column sequence number of the non-zero element. Row sequence numbers of the other non-zero elements are smaller than a row sequence number of the non-zero element. In other words, in response to the non-zero element being in the $i^{th}$ row and the $j^{th}$ column, the other non-zero elements are non-zero elements in elements of first j rows of the $(i-1)^{th}$ column. In the matrix A shown above, in response to the non-zero element being $A_{4,3}$, the other non-zero elements are non-zero elements in $A_{1,3}$, $A_{2,3}$, and $A_{3,3}$, that is, $A_{2,3}$.

A larger quantity of the other non-zero elements indicates a larger degree of a variable node corresponding to the other non-zero elements, and indicates that a larger quantity of non-zero elements are allocated to the variable node. Therefore, a smaller weight value is selected as a value of the non-zero element, to reduce a weight value of a variable node corresponding to the non-zero element.

A larger value of the another non-zero element indicates higher reliability of the variable node corresponding to the other non-zero elements, and indicates that a weight value allocated to the variable node is large. Therefore, a smaller weight value is selected as the value of the non-zero element, to reduce a weight value of the variable node corresponding to the non-zero element.

In at least one embodiment, the location of the non-zero element is obtained based on the PEG algorithm. That is, in response to the non-zero element being the $i^{th}$ row, a degree of a non-zero element corresponding to the first edge in the $i^{th}$ row is the smallest. Because the value of the non-zero element is in a negative correlation with the evaluation value corresponding to the reference information, in response to the evaluation value being the determined sequence number, a value of the non-zero element corresponding to the first edge is a maximum value in the weight set. A smaller determined sequence number of a location of a non-zero element corresponding to another edge in the $i^{th}$ row indicates that a variable node corresponding to the non-zero element is less likely to form a short cycle with another check node, or indicates that a cycle length of a minimum cycle formed with the another check node is longer. Assuming that a variable node selected at an $n^{th}$ time forms a cycle 4 with a previous node, nodes after the $n^{th}$ time all form the cycle 4. Because the value of the non-zero element is in a negative correlation with the evaluation value corresponding to the reference information, a large weight is allocated to a non-zero element with a small determined sequence number, and a large weight and a small weight are allocated to edges connected to the check node. Therefore, not all small weights are on a short cycle, to improve coding performance.

An example in which the evaluation value of the reference information is a sum of squares of the values of the other non-zero elements is used for description. The weight set W={1,2,4,8}, M=4, and N=12. The location of the non-zero element in the first row of the generator matrix is randomly selected. For example, column sequence numbers corresponding to locations of non-zero elements in the first row are {1,5,7,12}. In addition, a value of the non-zero element in the first row is a randomly allocated weight value, and the first row is {1,0,0,0,4,0,8,0,0,0,0,2} shown in the following matrix B. In response to degrees of elements in all columns in the second row except columns {1,5,7,12} being 0, four elements are randomly selected from elements whose degrees are 0 as locations of non-zero elements. For example, column sequence numbers corresponding to locations of non-zero elements in the second row are {3,4,8,11}, a weight value of the second row is randomly allocated, and the second row is {0,0,2,1,0,0,0,4,0,0,8,0} shown in the following matrix B. Degrees of all columns in the third row except {1,5,7,12} and {3,4,8,11} are 0. In other words, column sequence numbers corresponding to locations of non-zero elements in the third row are {2,6,9,10}. A weight value of the third row is randomly allocated, and the third row is {0,8,0,0,0,2,0,0,1,4,0,0} shown in the following matrix B. In response to a degree of each element in the fourth row being 1, and based on the PEG algorithm, the cycle length of the minimum cycle between the edge that is newly added and the edge that has been added is the longest, column sequence numbers corresponding to locations of non-zero elements in the fourth row is {1,3,5,10}, and a sum of squares of values of other elements is {1,4,16,16} are determined. Weights are allocated in descending order based on a negative correlation between the value of the non-zero element and the evaluation value corresponding to the reference information. The generator matrix is shown as the following matrix B, and elements in the fourth row are {8,0,4,0,2,0,0,0,0,1,0,0}.

$$B = \begin{pmatrix} 1 & 0 & 0 & 0 & 4 & 0 & 8 & 0 & 0 & 0 & 0 & 2 \\ 0 & 0 & 2 & 1 & 0 & 0 & 0 & 4 & 0 & 0 & 8 & 0 \\ 0 & 8 & 0 & 0 & 0 & 2 & 0 & 0 & 1 & 4 & 0 & 0 \\ 8 & 0 & 4 & 0 & 2 & 0 & 0 & 0 & 0 & 1 & 0 & 0 \end{pmatrix}$$

An example in which the evaluation value of the reference information is a determined sequence number of the non-zero element is used for description. First three rows of the matrix C are the same as those of the foregoing matrix B. In response to determined sequence numbers of column sequence numbers {1,3,5,10} corresponding to locations of non-zero elements in the fourth row being respectively {2,1,4,3}, weights are allocated in descending order based on a negative correlation between the value of the non-zero element and the evaluation value corresponding to the reference information. The generator matrix is shown as the following matrix C, and elements in the fourth row are {4,0,8,0,1,0,0,0,0,2,0,0}.

$$C = \begin{pmatrix} 1 & 0 & 0 & 0 & 4 & 0 & 8 & 0 & 0 & 0 & 0 & 2 \\ 0 & 0 & 2 & 1 & 0 & 0 & 0 & 4 & 0 & 0 & 8 & 0 \\ 0 & 8 & 0 & 0 & 0 & 2 & 0 & 0 & 1 & 4 & 0 & 0 \\ 4 & 0 & 8 & 0 & 1 & 0 & 0 & 0 & 0 & 2 & 0 & 0 \end{pmatrix}$$

In at least one embodiment, a quantity of the non-zero elements in each row of the generator matrix G is a quantity d of weight values in the weight set W. For the weight set W and the quantity d, refer to the foregoing description. Details are not described herein again. In response to the quantity of the non-zero elements in each row of the generator matrix G being the quantity d of weight values in the weight set W, a determination is made that the check node degree in the generator matrix G is d. In response to each coded symbol being uniquely decoded as d variable nodes, a maximum achievable rate of the variable nodes is 2d. In this way, a transmission rate and efficiency of coding modulation is improved.

In at least one embodiment, the generator matrix G includes P circulant permutation matrix groups, and the circulant permutation matrix group includes d circulant permutation sub-matrices.

The circulant permutation sub-matrix is a circulant permutation matrix (circulant permutation matrix, CPM). A quantity of rows of the circulant permutation sub-matrix is equal to a quantity of columns of the circulant permutation sub-matrix and is equal to a first ratio of N to d (that is, N/d). P is equal to a second ratio of M to the first ratio (that is, $P=M/(N/d)$). A matrix $D_0$ that is not assigned values is used as an example for description, $$D_0 = \begin{bmatrix} \begin{bmatrix} 0 & 0 & \cdots & 1 \\ 1 & 0 & \cdots & 0 \\ \vdots & \vdots & \vdots & \\ 0 & 0 & \cdots & 1 \end{bmatrix}_{\frac{N}{d} \times \frac{N}{d}} & \cdots & \begin{bmatrix} 1 & 0 & \cdots & 0 \\ 0 & 1 & \cdots & 0 \\ \vdots & \vdots & \vdots & \\ 0 & 0 & \cdots & 1 \end{bmatrix}_{\frac{N}{d} \times \frac{N}{d}} \\ \vdots & \ddots & \vdots \\ \begin{bmatrix} 0 & 1 & \cdots & 0 \\ 0 & 0 & \cdots & 0 \\ \vdots & \vdots & \vdots & \\ 0 & 0 & \cdots & 1 \end{bmatrix}_{\frac{N}{d} \times \frac{N}{d}} & \cdots & \begin{bmatrix} 0 & 0 & \cdots & 1 \\ 1 & 0 & \cdots & 0 \\ \vdots & \vdots & \vdots & \\ 0 & 0 & \cdots & 1 \end{bmatrix}_{\frac{N}{d} \times \frac{N}{d}} \end{bmatrix}_{M \times N}$$

As shown in the foregoing matrix Do, a quantity of rows and a quantity of columns of each circulant permutation sub-matrix in the matrix $D_0$ are both N/d. A quantity of circulant permutation matrix groups in the matrix $D_0$ is a ratio of the quantity of rows of the matrix $D_0$ to a quantity of rows of the circulant permutation sub-matrix, that is, M/(N/d). A quantity of circulant permutation sub-matrices in each circulant permutation matrix group is a ratio of a quantity of columns of the matrix $D_0$ to the quantity of columns of the circulant permutation sub-matrix, that is, N/(N/d) (that is, d).

In at least one embodiment, each row of the circulant permutation sub-matrix has a non-zero element, and a value of the non-zero element is a weight value in the weight set. In response to a quantity of non-zero elements in each row of the generator matrix G being equal to a quantity d of the weight values in the weight set, an element is selected from the circulant permutation sub-matrix in each row of the generator matrix G as a non-zero element, so that locations of the non-zero elements are uniformly allocated, to improve coding performance.

In at least one embodiment, a location of a non-zero element in the first row of the circulant permutation matrix group is obtained based on the PEG algorithm. A location of a non-zero element in a row of the circulant permutation sub-matrix other than the first row of the circulant permutation sub-matrix is obtained by performing cyclic shift based on a previous row of the row. In this way, after the location of the non-zero element in the first row is determined, the location of the non-zero element in the row other than the first row of the circulant permutation matrix group is determined. In addition, the cyclic shift enables the non-zero elements in a same circulant permutation sub-matrix to be in different columns, so that the locations of the non-zero elements are uniformly allocated, to help implement uniform distribution of variable node degrees. A cyclic shift direction is not limited in at least one embodiment, and a cyclic shift is performed one bit to the left, or a cyclic shift is performed one bit to the right.

In at least one embodiment, the reference information of the non-zero element in the generator matrix G includes values of other non-zero elements, and/or a determined sequence number of a location of the non-zero element.

In at least one embodiment, the evaluation value of reference information of the non-zero element in the generator matrix G is equal to a sum of squares of the values of the other non-zero elements, or the determined sequence number.

For the reference information and the evaluation value of the reference information, refer to the foregoing description. Details are not described herein again. A value is assigned to the non-zero element based on an evaluation value of the non-zero element, to help implement uniform distribution of weight values in a variable node and distribution optimization of weight values on the short cycle, so that coding performance is improved. In addition, the evaluation value is determined based on the values of the other non-zero elements and/or the determined sequence number of the location of the non-zero element, so that a weight value of a variable node corresponding to the non-zero element is reduced, to help implement uniform distribution of the weight values in the variable node, and improve decoding performance.

In at least one embodiment, values of non-zero elements in the circulant permutation sub-matrix are equal.

In other words, non-zero elements in a same circulant permutation sub-matrix are equal, and each circulant permutation sub-matrix in a same group of circulant permutation matrix is a weight value. In at least one embodiment, a value of a non-zero element in a matrix in which values of non-zero elements are equal is referred to as a weight of the matrix. In this way, the value of the non-zero element in the matrix or a value of a non-zero element in a circulant permutation sub-matrix below the row is determined by using a circulant permutation sub-matrix as a unit, to further improve coding performance.

An example in which the evaluation value of the reference information is a sum of squares of the values of the other non-zero elements and values of non-zero elements in the circulant permutation sub-matrix are equal is used for description. Assuming that the weight set W={1,2,4,8}, M=6, and N=12, d=4, the circulant permutation sub-matrix is 3*3, and a quantity of the circulant permutation sub-matrices is 8. Rows 1, 2, and 3 are referred to as a first circulant permutation matrix group in the generator matrix. Rows 4, 5, and 6 are referred to as a second circulant permutation matrix group in the generator matrix. Each circulant permutation matrix group includes three circulant permutation sub-matrices. Weight distribution of the first circulant permutation matrix group in the generator matrix is {1,2,4,8} shown in the following matrix D. Locations of non-zero elements in first four rows of the matrix D is the same as locations of non-zero elements in the foregoing matrix B and matrix C. A sum of squares of values of other non-zero elements corresponding to a connection edge in the fourth row of the matrix is sequentially calculated, to obtain {1,4,16,64}. Weights are allocated in descending order based on a negative correlation between the value of the non-zero element and the evaluation value corresponding to the reference information. Weights of a second group of circulant permutation matrices in the generator matrix is {8,4,2,1} shown in the following matrix D.

$$D = \begin{pmatrix} 1 & 0 & 0 & 0 & 2 & 0 & 4 & 0 & 0 & 0 & 0 & 8 \\ 0 & 0 & 1 & 2 & 0 & 0 & 0 & 4 & 0 & 0 & 8 & 0 \\ 0 & 1 & 0 & 0 & 0 & 2 & 0 & 0 & 4 & 8 & 0 & 0 \\ 0 & 8 & 0 & 4 & 0 & 0 & 0 & 0 & 2 & 0 & 1 & 0 \\ 0 & 0 & 8 & 0 & 0 & 4 & 2 & 0 & 0 & 1 & 0 & 0 \\ 8 & 0 & 0 & 0 & 4 & 0 & 0 & 2 & 0 & 0 & 0 & 1 \end{pmatrix}$$

A type of the generator matrix is not limited in at least one embodiment, and the generator matrix is a matrix corresponding to the reference information or the evaluation value in the foregoing example. In at least one embodiment, the sending device determines the generator matrix G based on a value of N and/or a transmission rate.

The value of N is equal to a length of a bit sequence. In other words, the value of N is a length of a to-be-transmitted symbol sequence. Because a column length of the generator matrix G is equal to N, the generator matrix G is determined based on the value of N, so that a success rate of information coding or decoding is improved. Similarly, the generator matrix G is further determined based on a value of M.

In at least one embodiment, the transmission rate is a minimum value of the transmission rate. The transmission rate is a ratio of the length of the bit sequence to the length of the symbol sequence, for example, $N/m'_i$. The transmission rate is determined by a base station or the sending device based on a channel parameter, or the like. In addition, different generator matrices perform coding or decoding on information of different bit lengths at different rates. Therefore, the generator matrix G is determined based on the value of N and/or the transmission rate, so that efficiency of information coding or decoding is improved.

Figure 5A:
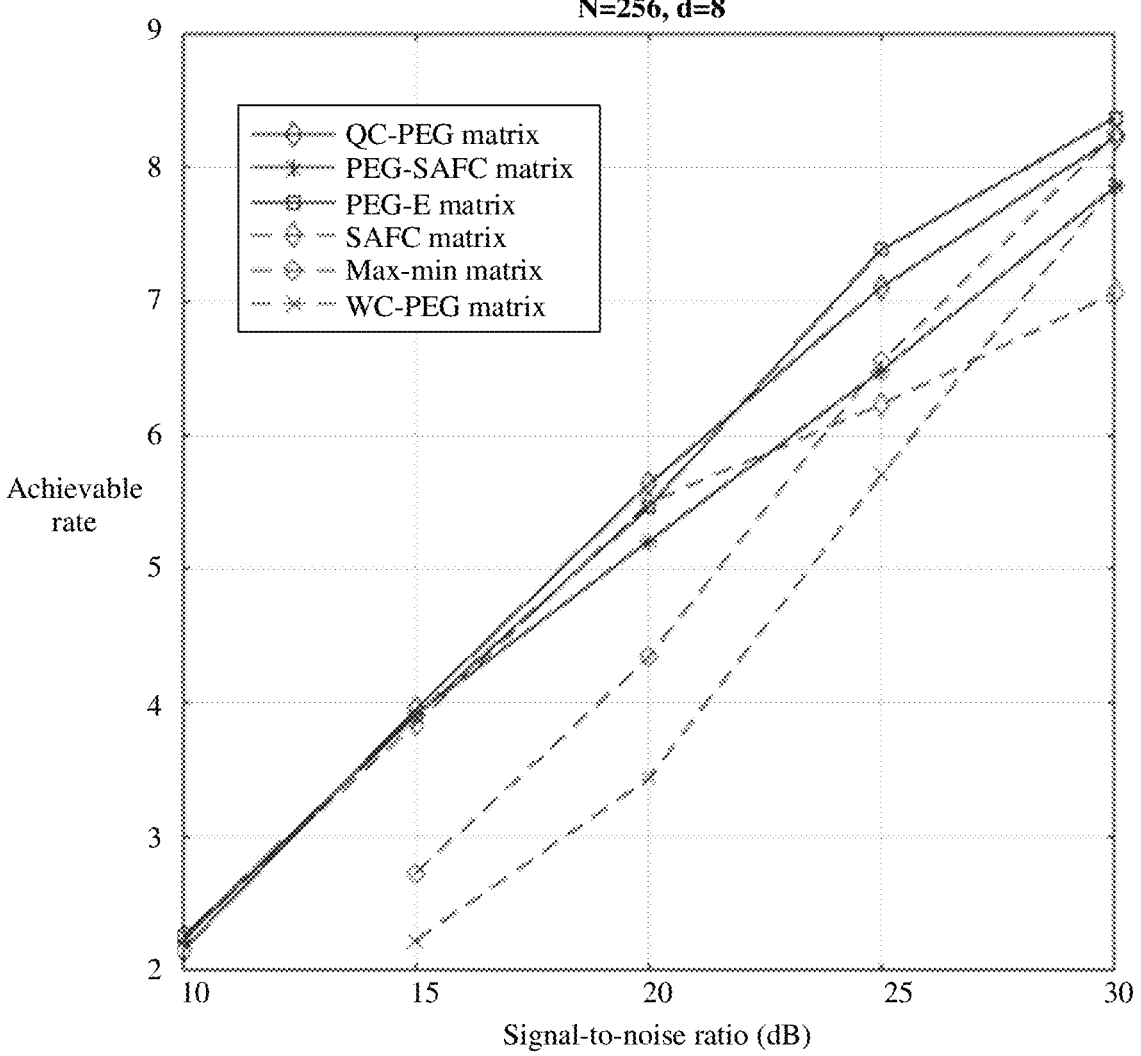
FIG. 5A is a diagram of a relationship between achievable rates and signal-to-noise ratios of different generator matrices according to at least one embodiment.
Figure 5B:
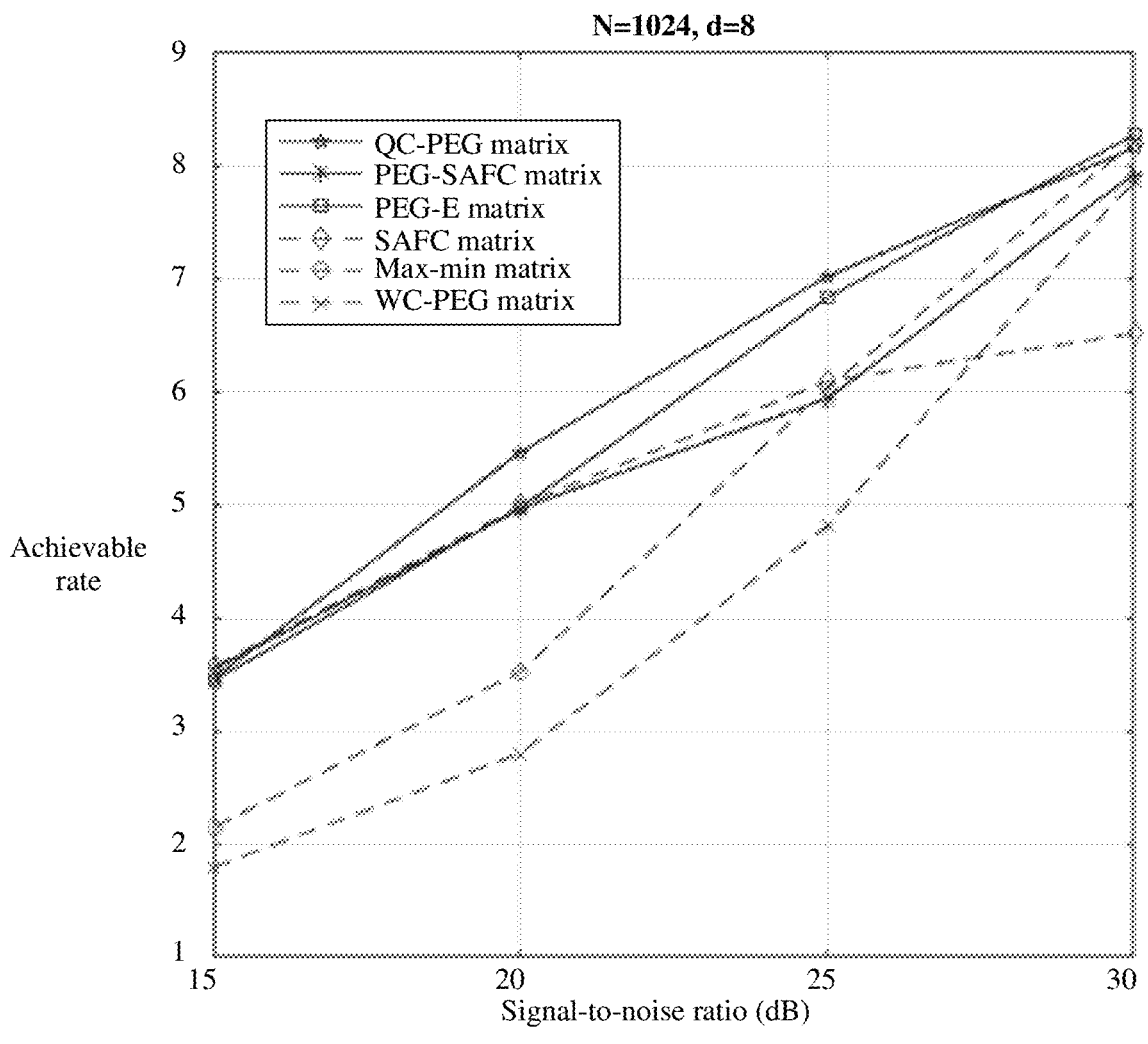
FIG. 5B is a diagram of another relationship between achievable rates and signal-to-noise ratios of different generator matrices according to at least one embodiment.

FIG. 5A and FIG. 5B each are a diagram of a relationship between achievable rates (achievable rate) and signal-to-noise ratios (SNB) of different generator matrices according to at least one embodiment. The generator matrices in FIG. 5A and FIG. 5B includes a quasi-cyclic-progressive edge-growth (quasi-cyclic-PEG, QC-PEG) matrix, a progressive edge-growth-short analog fountain codes (PEG-short analog fountain codes, PEG-SAFC) matrix, a progressive edge-growth-enhancement (PEG-enhancement, PEG-E) matrix, a SAFC matrix, a max-min matrix, and a weight coefficient-progressive edge-growth (weight coefficient-PEG, WC-PEG) matrix.

As shown in FIG. 5A, in response to an information bit length N=256, and a check node degree d=8, rate performance of the PEG-E matrix and the QC-PEG matrix is optimal. In addition, high rate performance of the PEG-E is optimal. As shown in FIG. 5B, in response to an information bit length N=1024, and a check node degree d=8, rate performance of the PEG-SAFC matrix is optimal. The PEG-SAFC matrix is far superior to the max-min matrix and the WC-PEG matrix at a low rate, and has similar performance to the max-min matrix and is superior to the WC-PEG matrix in a high rate scenario.

Optionally, in response to a length of a to-be-transmitted bit sequence (a value of N) being greater than or equal to a first threshold, a generator matrix obtained based on a QC-PEG algorithm is used as a generator matrix G. In response to the length of the to-be-transmitted bit sequence being less than the first threshold and being greater than or equal to a second threshold, a generator matrix obtained based on a PEG-SAFC algorithm is used as the generator matrix G. In response to the length of the to-be-transmitted bit sequence being less than or equal to the second threshold, a generator matrix obtained based on a PEG-E algorithm is used as the generator matrix G.

The first threshold and the second threshold are not limited in at least one embodiment. The first threshold is greater than the second threshold. The first threshold is 1024. The second threshold is 64. Information with a length greater than or equal to the first threshold is referred to as medium and long information. Information with a length less than the first threshold and greater than or equal to the second threshold is referred to as medium information.

Information with a length less than or equal to the second threshold is referred to as medium and short information. In this way, an algorithm for constructing the generator matrix G is determined based on the length of the bit sequence, to improve demodulation decoding performance of the generator matrix G.

A symbol sequence transmitted by a sending device to a channel is a symbol sequence obtained by performing coding modulation based on the generator matrix or a partial sequence number sequence in the symbol sequence, or is a symbol sequence obtained by performing coding modulation based on a first sub-matrix including some rows of the generator matrix. The symbol sequence is transmitted in a one-time or multiple-time transmission manner. A receiving device performs, based on all received symbol sequences, demodulation decoding by using the generator matrix or a second sub-matrix including some rows of the generator matrix.

In at least one embodiment, a symbol sequence transmitted by the sending device at an $i^{th}$ time is denoted as $c_i$. In response to i being greater than or equal to 2, a symbol sequence transmitted last time is a symbol sequence transmitted at an $(i-1)^{th}$ time. In response to i being less than a maximum value of i, a symbol sequence transmitted next time is a symbol sequence transmitted at an $(i+1)^{th}$ time. For example, a symbol sequence $c_{i-1}$ represents the symbol sequence transmitted last time, and a symbol sequence $c_{i-1}$ represents the symbol sequence transmitted next time. A first sub-matrix $G_{i-1}$ represents a first sub-matrix used to perform coding modulation on the symbol sequence $c_{i-1}$ transmitted last time.

Because noise exists in the channel, a symbol sequence received by the receiving device at the $i^{th}$ time is denoted as $y_i$. In response to i being greater than or equal to 2, a symbol sequence received last time is a symbol sequence received at the $(i-1)^{th}$ time. In response to i being less than the maximum value of i, a symbol sequence received next time is a symbol sequence received at the $(i+1)^{th}$ time. For example, a symbol sequence $y_{i-1}$ represents the symbol sequence received last time, and a symbol sequence $y_{i+1}$ represents the symbol sequence received next time. A symbol sequence $y_1, \ldots$, and the symbol sequence $y_i$ represent symbol sequences received from the first time to the $i^{th}$ time, that is, symbol sequences received for first i times. A second sub-matrix $G'_{i-1}$ represents a second sub-matrix used to perform demodulation decoding based on symbol sequences (that is, the symbol sequence $y_1, \ldots$, and a symbol sequence $y_{i-1}$) received for first (i-1) times.

In at least one embodiment, M is a quantity of rows of the generator matrix, in other words, M is a maximum quantity of transmission sequence numbers, and i is a positive integer less than or equal to M. In other words, a maximum value of a length of the symbol sequence is M, and a maximum value of a transmission time of the symbol sequence is M. A total transmission time of the symbol sequence is understood as the maximum value of i. In response to the total transmission time being 1, the sending device transmits the symbol sequence corresponding to the bit sequence in a one-time transmission manner. The receiving device performs demodulation decoding based on the symbol sequence received at the first time, and the demodulation decoding succeeds, to restore the bit sequence s sent by the sending device. A length of the symbol sequence is a positive integer less than or equal to M. In response to the total transmission time being M, the sending device transmits the symbol sequence corresponding to the bit sequence in a M-time transmission manner, and a length of a symbol sequence transmitted each time is 1. The symbol sequence transmitted each time is a symbol sequence obtained by the sending device by performing coding modulation on a first sub-matrix including one row of the generator matrix, or a symbol sequence obtained by sequentially selecting one symbol from the symbol sequence obtained by performing coding modulation on the generator matrix. In addition, the receiving device performs demodulation decoding based on symbol sequences received for first (M−1) times, and the demodulation decoding all fails. Whether the demodulation decoding succeeds or fails is determined based on whether the receiving device sends, within preset duration, indication information indicating that the demodulation decoding succeeds or fails. The preset duration and a type of the indication information are not limited in at least one embodiment. The indication information is an acknowledgement (acknowledgement, ACK). In this case, after the ACK is received, a determination is made that the demodulation decoding succeeds; otherwise, a determination is made that the demodulation decoding fails.

A total length of symbol sequences transmitted by the sending device to the receiving device is to be less than or equal to M. A length of the symbol sequence $c_i$ transmitted this time is denoted as $m_i$, and a total length of the symbol sequences received by the receiving device for the first (i−1) times is denoted as $M'_{i-1}$. In this case, $M'_{i-1}$, is equal to a sum of lengths of the symbol sequences received for the first (i−1) times. A length of the symbol sequence $y_i$ received by the receiving device is equal to the length of the symbol sequence $c_i$ transmitted by the sending device. In other words, the length of the symbol sequence $y_i$ is $m_i$. A formula for calculating the total length $M'_{i-1}$ of the symbol sequences received by the receiving device for the first (i−1) times is $M'_{i-1} = \varepsilon_{k=1}^{i-1} m_k$. For example, in response to i being 3, $M'_2 = m_1 + m_2$.

In response to $M'_{i-1}$ being less than M, the sending device transmits a next symbol sequence, namely, $c_i$, to the receiving device. In addition, the length of the symbol sequence $c_i$ is to be less than or equal to a difference between M and $M'_{i-1}$. In response to the total length $M'_{i-1}$ being greater than or equal to M, the next symbol sequence stops to be transmitted. In addition, the sending device further determines, based on the indication information indicating that the demodulation decoding succeeds or fails, whether to transmit the next symbol sequence. To be specific, after the indication information indicates that the demodulation decoding succeeds, the next symbol sequence stops to be transmitted; otherwise, the next symbol sequence continues to be transmitted.

Figure 6:
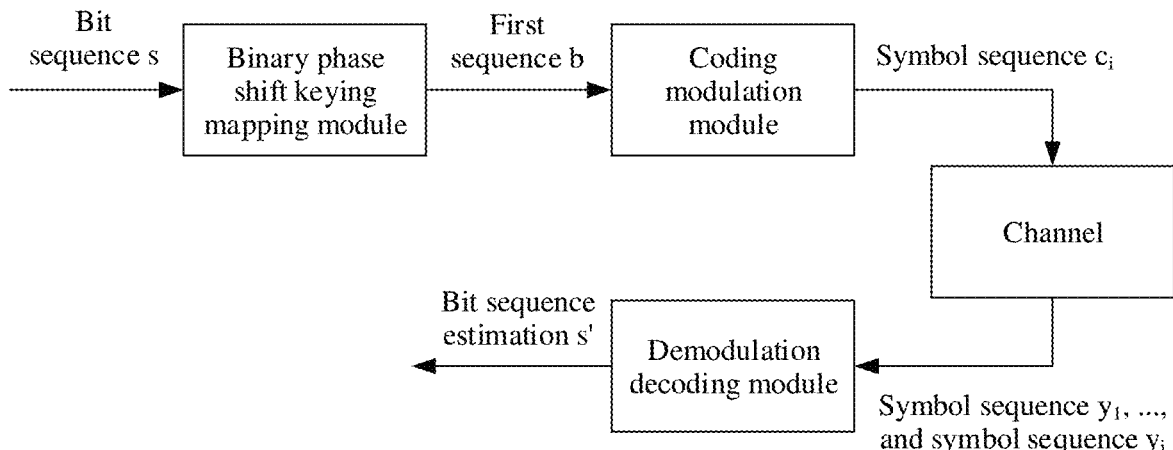
FIG. 6 is an implementation block diagram of a data transmission method according to at least one embodiment.

FIG. 6 is an implementation block diagram of a data transmission method according to at least one embodiment. In FIG. 6, an example in which a sending device transmits a symbol sequence to a receiving device at an $i^{th}$ time is used for description. The symbol sequence is a partial symbol sequence $c_i$ selected at the $i^{th}$ time from a symbol sequence C obtained by the sending device by performing coding modulation on a first sequence b based on a generator matrix G, or a symbol sequence $c_i$ obtained by performing coding modulation on the first sequence b based on a first sub-matrix $G_i$.

A step of selecting the partial symbol sequence $c_i$ is determined before the first transmission, or is determined based on feedback information (for example, a channel parameter) received from the receiving device after each transmission of a symbol sequence. This is not limited herein.

A method for selecting the partial symbol sequence $c_i$ from the symbol sequence C is consistent with a method for selecting the first sub-matrix $G_i$ from the generator matrix G. To be specific, in response to i being 1, first $m_1$ (namely, $m_i$) symbols are selected from the symbol sequence C to obtain the symbol sequence $c_1$ (namely, $c_1$), so that a length of $c_i$ is $m_1$. In addition, a sub-matrix including first $m_1$ (namely, $m_i$) rows is selected from the generator matrix G as the first sub-matrix $G_1$ (namely, $G_1$), and a quantity of rows of the first sub-matrix $G_1$ is $m_1$. In response to i being greater than 1, an $(m_{i-1}+1)^{th}$ symbol to an $(m_{i-1}+m_i)^{th}$ symbol are selected from the symbol sequence C to obtain the symbol sequence $c_i$, so that a length of $c_i$ is $m_i$. In addition, a sub-matrix including an $(m_{i-1}+1)^{th}$ row to an $(m_{i-1}+m_i)^{th}$ row is selected from the generator matrix G as the first sub-matrix $G_i$, and a quantity of rows of the first sub-matrix $G_i$ is $m_i$.

As shown in FIG. 6, the sending device performs binary phase shift keying (binary phase shift keying, BPSK) mapping on a to-be-transmitted bit sequence s through a BPSK mapping module, to obtain the first sequence b. Then, coding modulation is performed on the first sequence b through a coding modulation module to obtain the symbol sequence $c_i$. The sending device sends the symbol sequence $c_i$ to the receiving device through a channel. Because noise exists in the channel, the receiving device performs, through a demodulation decoding module, demodulation decoding on a symbol sequence $y_1, \ldots$, and a symbol sequence $y_i$ that are currently received and that include noise, to obtain a bit sequence estimation s', and restore the bit sequence s sent by the sending device.

In at least one embodiment, the bit sequence is a sequence formed by an arrangement of 0 and 1. In other words, each element in the bit sequence s is 0 or 1. Each element in the bit sequence estimation s' is a sequence formed by an arrangement of 0 and 1, or is a probability value indicating a possibility that the element is 0 or 1. The bit sequence estimation s' is alternatively a logarithmic probability ratio indicating a logarithmic equality between probabilities of the element being 0 and 1.

BPSK is one of conversion manners for converting an analog signal into a digital signal. 2-value (1-bit) information is transmitted and received at the same time. Each element in the first sequence b is 1 or −1. A relationship between the first sequence b and the bit sequence s satisfies b=1−2s or b=2s−1.

In at least one embodiment, the first sub-matrix $G_i$ is a sub-matrix including some rows of the generator matrix G, and is used to perform coding modulation on the first sequence. A relationship between the first sequence b, the first sub-matrix $G_i$, and the symbol sequence $c_i$ satisfies $c_i = G_i$ b. A structure of the first sub-matrix $G_i$ is not limited in at least one embodiment. In at least one embodiment, the quantity of rows of the first sub-matrix $G_i$ is equal to the length $m_i$ of the symbol sequence $c_i$. In response to i being 1, the first sub-matrix $G_i$ is the sub-matrix including the first $m_i$ rows of the generator matrix G. In response to i being greater than 1, the first sub-matrix $G_i$ is the sub-matrix including the $(m_{i-1}+1)^{th}$ row to the $(m_{i-1}+m_i)^{th}$ row in the generator matrix.

As described above, the generator matrix G is a M*N generator matrix. In other words, a quantity of rows of the generator matrix G is M, and a quantity of columns of the generator matrix is N. $m_{i-1}$ is equal to a quantity of rows of a first sub-matrix $G_{i-1}$ used to perform coding modulation on a symbol sequence $c_{i-1}$ transmitted last time, and is equal to a length $m_{i-1}$ of the symbol sequence $c_{i-1}$. On a premise that a maximum quantity of transmission symbols is M, in response to i being 1, $m_i$ (namely, $m_i$) is a positive integer less than M. In response to i being greater than 1, and on a premise that a sum of lengths of symbol sequences transmitted for first (i–1) times is $M'_{i-1}$, $m_i$ is a positive integer less than or equal to a difference between M and $M'_{i-1}$.

For example, in response to the generator matrix G being a 12*12 matrix, M=12, and N=12. A length of a symbol sequence transmitted at the first time is 5, a length of a symbol sequence transmitted at the second time is 4, and a length of a symbol sequence transmitted at the third time is 3. In this case, $m_i$ is equal to 5, $m_2$ is equal to 4, and $m_3$ is equal to 3. A quantity of rows of the first sub-matrix $G_i$ used for the first time of coding modulation is 5. In other words, the first sub-matrix $G_i$ is a sub-matrix including first five rows in the generator matrix G. A quantity of rows of a first sub-matrix $G_2$ used for the second time of coding modulation is 4. In other words, the first sub-matrix $G_2$ is a sub-matrix including the sixth row to the ninth row in the generator matrix G. A quantity of rows of a first sub-matrix $G_3$ used for the third time of coding modulation is 3. In other words, the first sub-matrix $G_3$ is a sub-matrix including the tenth row to the twelfth row in the generator matrix G.

In response to lengths of the bit sequence s and the first sequence b being N, and a length of the symbol sequence $c_i$ obtained by performing coding modulation on the first sequence b by using the first sub-matrix $G_i$ and a length of the partial symbol sequence $c_i$ selected at the $i^{th}$ time from the symbol sequence obtained by performing coding modulation on the first sequence b by using the generator matrix G are both $m'_i$, in response to a transmission rate (N/$m_i$) being less than a channel capacity (capacity), the receiving device performs demodulation decoding based on symbol sequences received from the sending device for first i times, so that the bit sequence estimation s' obtained through demodulation decoding is the bit sequence s.

In at least one embodiment, a length $m_i$ of a symbol sequence sent by the sending device each time and the maximum quantity M of transmission symbols are not limited. Because the sending device is usually an access network device, a value of $m_i$ and a value of M is determined by the sending device. The value of $m_i$ and the value of M is notified by the sending device to the receiving device, or is determined by the receiving device based on related configuration information by using a pre-agreed calculation method or table.

In at least one embodiment, the sending device determines the value of the length $m_i$ of the symbol sequence $c_i$ and/or the value of M based on the channel parameter of the channel.

In at least one embodiment, the channel parameter is a channel status, the channel capacity, or the like. This is not limited herein. $m_i$ is a positive integer less than or equal to the difference between M and $M'_{i-1}$. A maximum transmission symbol M is determined based on the channel parameter of the channel, and a value of the length $m_i$ of the symbol sequence $c_i$ in a remaining symbol sequence that is not transmitted is determined based on the lengths of the symbol sequences transmitted for the first (i–1) times, so that a success rate of information transmission and efficiency of coding or decoding is improved.

After decoding succeeds, or in response to a total length Mt of all symbol sequences transmitted for the first i times being greater than or equal to M, a next symbol sequence $c_{i+1}$ is not to be transmitted, and a length $m_i+_1$ of the symbol sequence $c_{i+1}$ is not to be determined.

In at least one embodiment, the sending device sends configuration information to the receiving device.

In at least one embodiment, the configuration information is used to determine parameter information of the generator matrix or parameter information of a second sub-matrix $G'_i$ including some rows of the generator matrix. The second sub-matrix $G'_i$ is used to perform demodulation decoding based on the symbol sequences received for the first i times. The receiving device determines, based on the configuration information, the parameter information of the generator matrix G or the second sub-matrix $G'_i$ used for demodulation decoding. In this way, the receiving device determines the matrix used for demodulation decoding, to improve a success rate of demodulation decoding.

In at least one embodiment, the second sub-matrix $G'_i$ is a sub-matrix including first m rows of the generator matrix G. In other words, a quantity of rows of the second sub-matrix $G'_i$ is $m_i$. As described above, the length of the symbol sequence $c_i$ is $m_i$, so that a length of the symbol sequence $y_i$ is also $m_i$. A relationship between the symbol sequence $y_i$, the second sub-matrix $G'_i$, and the bit sequence estimation s' satisfies $c_i=G'_i$ s'. In response to i being 1, $m'_i$ is equal to $m_i$. On a premise that a maximum value of the length of the symbol sequence is M, in response to i being 1, $m_i$ (namely, $m'_1$) is a positive integer less than M. In other words, the second sub-matrix $G'_1$ is the first sub-matrix $G_1$. In response to i being greater than 1, $m'_i$ is equal to a sum of $m_{i-1}$ and $m_i$. $m_{i-1}$ is a quantity of rows of a second sub-matrix $G'_{i-1}$ used to perform demodulation decoding based on symbol sequences received for first (i–1) times. On the premise that the maximum quantity of transmission symbols is M, and the sum of the lengths of the symbol sequences transmitted for the first (i–1) times is $M'_{i-1}$, in response to i being greater than 1, $m_i$ is a positive integer less than or equal to the difference between M and $M'_{i-1}$. In response to $m'_i=M$, demodulation decoding being performed by using a sub-matrix including all rows of the generator matrix G; otherwise, the second sub-matrix $G'_i$ is used to perform demodulation decoding.

For example, in response to the generator matrix G is a 12*12 matrix, M=12, and N=12. A length $m_i$ of a symbol sequence transmitted at the first time is 5, a length $m_2$ of a symbol sequence transmitted at the second time is 4, and a length $m_3$ of a symbol sequence transmitted at the third time is 3. In this case, a quantity $m'_1$ of rows of a second sub-matrix $G_i$ used for the first time of demodulation decoding is equal to 5. In other words, the second sub-matrix $G'_1$ is a sub-matrix including first five rows of the generator matrix G. A quantity $m'_2$ of rows of a second sub-matrix $G'_2$ used for the second time of demodulation decoding is equal to 5+4. In other words, the second sub-matrix $G'_3$ is a sub-matrix including first nine rows of the generator matrix G. A quantity $m'_3$ of rows of a second sub-matrix $G'_3$ used for the third time of demodulation decoding is equal to 9+3, and is equal to M. In other words, the second sub-matrix $G'_3$ is the generator matrix G.

In at least one embodiment, the parameter information of the generator matrix G includes the value of M and a value of a length N of the bit sequence s. In this way, the quantity of rows and the quantity of columns of the generator matrix G is determined. The parameter information of the second sub-matrix $G'_i$ includes the value of N and the quantity of rows of the second sub-matrix. As described above, in response to i being 1, the quantity $m'_i$ of rows of the second sub-matrix $G'_i$ is equal to $m_i$. In response to i being greater than 1, $m'_i$ is equal to the sum of $m'_{i-1}$ and $m_i$. A value of the quantity $m'_i$ of rows of the second sub-matrix $G'_i$ is obtained based on a value of $m_i$. The value of N is also the quantity of columns of the generator matrix G. In other words, the value of N is a quantity of columns of the second sub-matrix $G'_i$. In this case, the quantity of rows and the quantity of columns of the second sub-matrix $G'_i$ is determined based on the value of N and the value of $m'_i$.

The parameter information of the second sub-matrix $G'_i$ further includes a value of a transmission time i of the symbol sequence $y_i$, a value of the maximum quantity M of transmission symbols, and the like. This is not limited herein. After obtaining the value of i and/or the value of M, the receiving device obtains the value of $m_i$ based on a rule or a table preset by the sending device and the receiving device.

In response to the receiving device autonomously performing counting, the receiving device autonomously obtains the value of i. In addition, the receiving device obtains, based on the received symbol sequence $y_i$, the length $m_i$ of the symbol sequence $y_i$, and calculate the value of $m_i$ based on the quantity $m'_{i-1}$ of rows of the second sub-matrix $G'_{i-1}$ used to perform demodulation decoding based on the symbol sequences received for first (i-1) times. The receiving device further obtains the value of $m_i$, the value of M, and/or the like based on the channel parameter.

Figure 7:
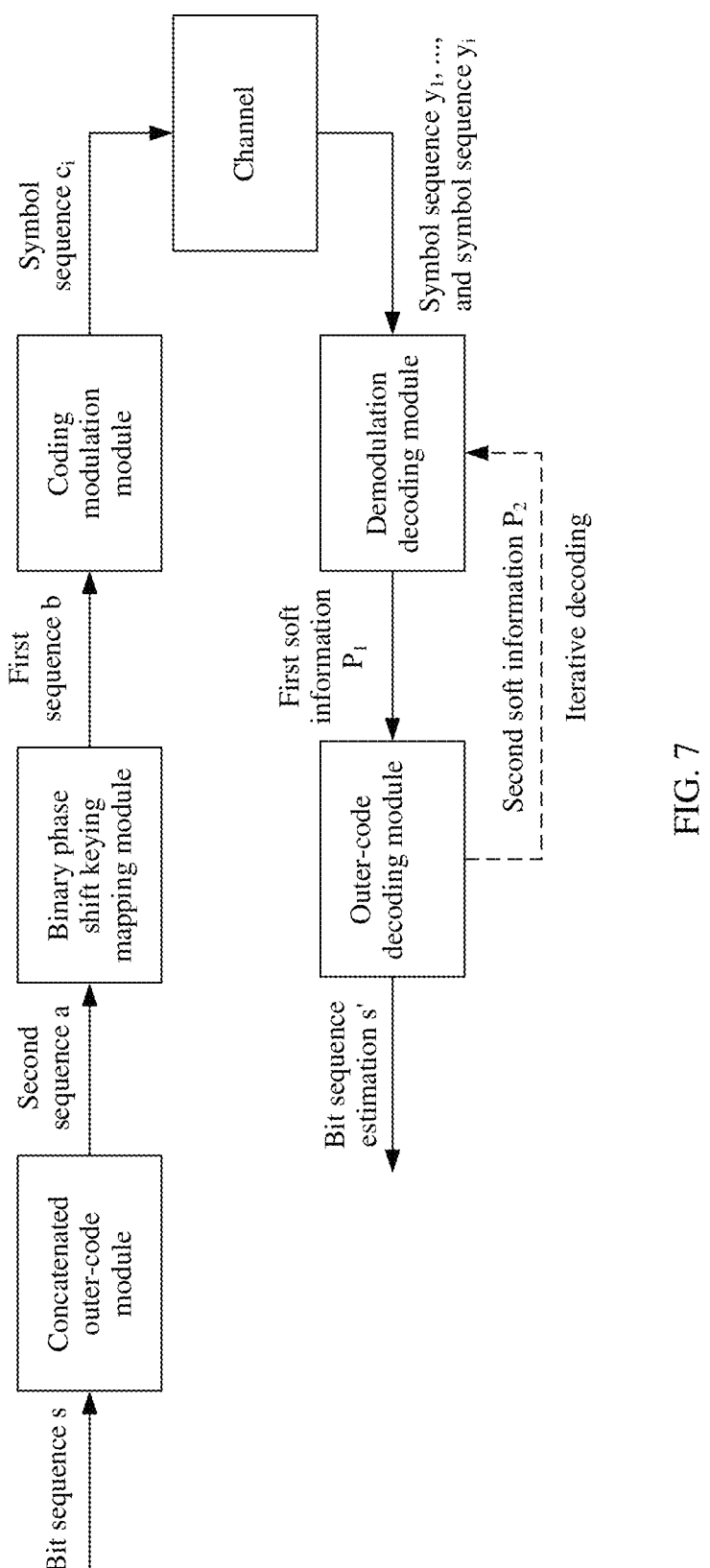
FIG. 7 is an implementation block diagram of another data transmission method according to at least one embodiment.

FIG. 7 is an implementation block diagram of another data transmission method according to at least one embodiment. The method is consistent with that in FIG. 6. An example in which a sending device transmits a symbol sequence to a receiving device at an $i^{th}$ time is used for description. As shown in FIG. 6, the sending device performs concatenated outer-code coding on a to-be-transmitted bit sequence s to obtain a second sequence a. Then, the sending device performs BPSK mapping on the second sequence a to obtain a first sequence b. Then, coding modulation is performed on the first sequence b to obtain a symbol sequence $c_i$, and the symbol sequence $c_i$ is sent to the receiving device on a channel. Because noise exists in the channel, the receiving device performs demodulation decoding on a symbol sequence $y_1$, . . . , and a symbol sequence $y_i$ that are currently received and that include noise, to obtain first soft information $P_1$. The receiving device performs outer-code decoding based on the first soft information $P_1$, to obtain a bit sequence estimation s' and restore the bit sequence s sent by the sending device.

The soft information includes a probability value that each bit in the bit sequence s corresponding to inner code is 0 or 1, or includes a logarithmic probability ratio (a ratio of a probability of being 0 to a probability of being 1) corresponding to the bit sequence s. Lengths of the bit sequence s, the first sequence b, the second sequence a, the first soft information $P_1$, and the bit sequence estimation s' are all N. For the bit sequence s, the first sequence b, the second sequence a, and the symbol sequence $c_i$, refer to the description in FIG. 6. For the first soft information a and the bit sequence estimation s', refer to the description of the bit sequence estimation s' in FIG. 6. Details are not described herein again.

Concatenated outer-code coding is performed on the bit sequence s to improve coding performance. In response to the sending device performing an operation of concatenated outer-code coding, after performing an operation of demodulation decoding on the symbol sequence $y_i$, the receiving device obtains the first soft information $P_1$ describing a probability that an element in the bit sequence is 0 or 1. Outer-code decoding is performed on the first soft information $P_1$ by using an outer-code decoding module, to improve decoding accuracy.

As shown in FIG. 7, the step of performing outer-code decoding on the first soft information $P_1$ is a process of iterative decoding. In at least one embodiment, soft information obtained by performing demodulation decoding by a demodulation decoding module (or referred to as an inner-code decoding module) is referred to as the first soft information $P_1$, and soft information obtained by performing decoding by the outer-code decoding module is referred to as second soft information $P_2$. The second soft information $P_2$ is input to the demodulation decoding module, so that iterative decoding is performed on the soft information between the outer-code decoding module and the demodulation decoding module, until demodulation decoding succeeds or iterative decoding ends, to obtain the bit sequence estimation s'. A quantity of times of iterative decoding is not limited in at least one embodiment, and is 5 to 10. Interactive decoding is performed on the soft information at least once, to further improve demodulation decoding accuracy.

Figure 8:
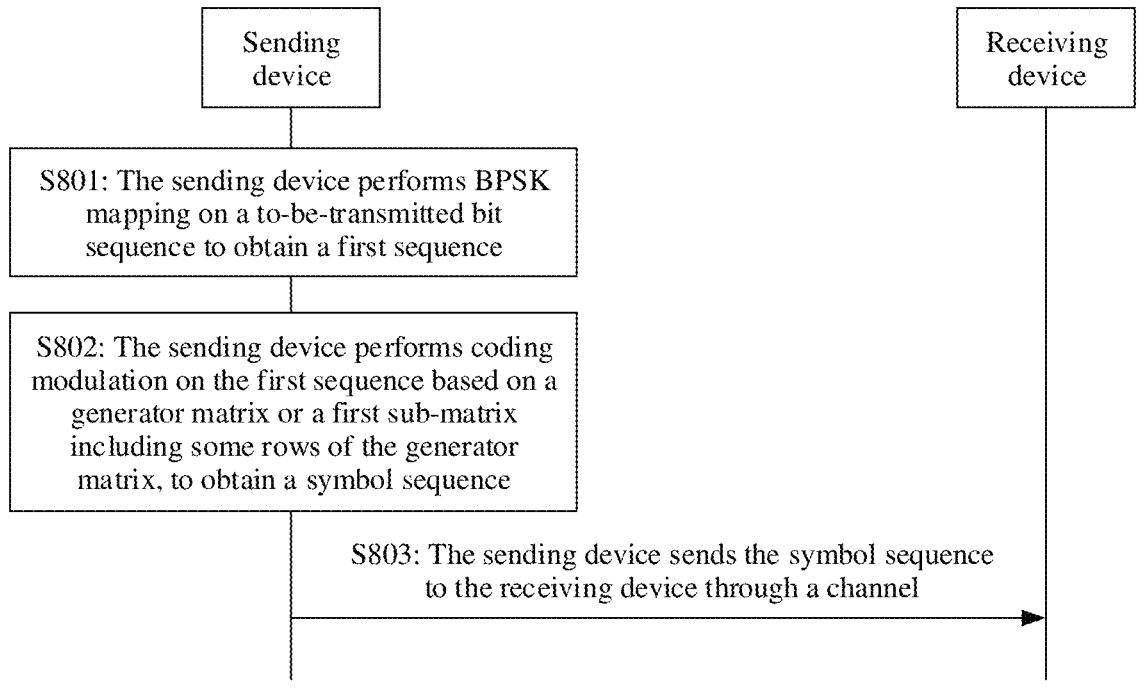
FIG. 8 is a schematic flowchart of a data transmission method according to at least one embodiment.

FIG. 8 is a schematic flowchart of a data transmission method according to at least one embodiment. The method is applied to the system shown in FIG. 1, and the method is described by using a sending device as an execution body. The method shown in FIG. 8 includes steps S801 to S803.

S801: The sending device performs BPSK mapping on a to-be-transmitted bit sequence to obtain a first sequence.

In at least one embodiment, each element in the bit sequence is 0 or 1, each element in the first sequence is 1 or −1, and lengths of both the bit sequence and the first sequence are N.

In at least one embodiment, step S801 includes: The sending device performs concatenated outer-code coding on the to-be-transmitted bit sequence to obtain a second sequence, where a length of the second sequence is N. The sending device performs BPSK mapping on the second sequence to obtain the first sequence. In this way, concatenated outer-code coding is performed on the bit sequence, to improve coding performance.

S802: The sending device performs coding modulation on the first sequence based on a generator matrix or a first sub-matrix including some rows of the generator matrix, to obtain a symbol sequence.

A length $m_i$ of the symbol sequence $c_i$ is a positive integer less than or equal to a maximum quantity M of transmission symbols. i is a transmission time of the symbol sequence. i is a positive integer less than or equal to M. A quantity of columns of the generator matrix is N. A quantity of rows of the generator matrix is M. Both M and N are positive integers.

In at least one embodiment, a location of a non-zero element in each row of the generator matrix is obtained based on a progressive edge-growth algorithm. Values of non-zero elements in each row of the generator matrix are different and each are a weight value in a weight set. A value of a non-zero element in the first row of the generator matrix is a weight value randomly allocated in the weight set. A value of a non-zero element in a row of the generator matrix other than the first row of the generator matrix is related to reference information of the non-zero element, and is in a negative correlation with an evaluation value corresponding to the reference information.

The location of the non-zero element in each row of the generator matrix is obtained based on the PEG algorithm, so that generation of a short cycle is reduced, and a minimum cycle length of the generated short cycle is lengthened, to improve decoding performance. In addition, a value is assigned to the non-zero element based on an evaluation value of the non-zero element, to help implement uniform distribution of weight values in a variable node and distribution optimization of weight values on the short cycle, so that coding performance is improved.

In at least one embodiment, the reference information of the non-zero element includes a quantity of other non-zero elements, and/or values of the other non-zero elements, and/or a determined sequence number of a location of the non-zero element. Column sequence numbers of the other non-zero elements are the same as a column sequence number of the non-zero element. Row sequence numbers of the other non-zero elements are smaller than a row sequence number of the non-zero element.

In at least one embodiment of the foregoing example, the evaluation value is equal to the quantity of other non-zero elements, or a sum of squares of the values of the other non-zero elements, or the determined sequence number.

The evaluation value determined based on the reference information such as the quantity of other non-zero elements, and/or the values of the other non-zero elements, and/or the determined sequence number of the location of the non-zero element is used to further improve the uniform distribution of the weight values in the variable node and the distribution optimization of the weight values on the short cycle. This helps further improve the coding performance.

In at least one embodiment, a quantity of non-zero elements in each row of the generator matrix is a quantity d of weight values in the weight set. In this way, a transmission rate and efficiency of coding modulation is improved.

In at least one embodiment of the foregoing example, the generator matrix includes P circulant permutation matrix groups. The circulant permutation matrix group includes d circulant permutation sub-matrices. A quantity of rows of the circulant permutation sub-matrix is equal to a quantity of columns of the circulant permutation sub-matrix and is equal to a first ratio of N to d. P is equal to a second ratio of M to the first ratio. Each row of the circulant permutation sub-matrix has a non-zero element. A location of a non-zero element in the first row of the circulant permutation matrix group is obtained based on the progressive edge-growth algorithm. A location of a non-zero element in a row of the circulant permutation sub-matrix other than the first row of the circulant permutation sub-matrix is obtained by performing cyclic shift based on a previous row of the row.

In response to the quantity of non-zero elements in each row of the generator matrix being equal to the quantity d of weight values in the weight set, an element is selected from the circulant permutation sub-matrix in each row of the generator matrix as a non-zero element, so that locations of non-zero elements are uniformly allocated, and the transmission rate and efficiency of coding modulation is improved. The location of the non-zero element in the first row of the circulant permutation matrix group is obtained based on the PEG algorithm. The location of the non-zero element in the row of the circulant permutation sub-matrix other than the first row of the circulant permutation sub-matrix is obtained by performing cyclic shift based on the previous row of the row. In this way, after the location of the non-zero element in the first row is determined, a location of a non-zero element in a row other than the first row of the circulant permutation matrix group is determined. In addition, the cyclic shift enables non-zero elements in a same circulant permutation sub-matrix to be in different columns, so that locations of the non-zero elements are uniformly allocated, to help implement uniform distribution of variable node degrees and the distribution optimization of the weight values on the short cycle.

In at least one embodiment of the foregoing example, the reference information of the non-zero element includes values of other non-zero elements, and/or a determined sequence number of a location of the non-zero element. Column sequence numbers of the other non-zero elements are the same as a column sequence number of the non-zero element. Row sequence numbers of the other non-zero elements are smaller than a row sequence number of the non-zero element.

In at least one embodiment of the foregoing example, the evaluation value is equal to a sum of squares of the values of the other non-zero elements, or the determined sequence number.

The evaluation value determined based on the reference information such as the values of the other non-zero elements and/or the determined sequence number of the location of the non-zero element is used to further improve the uniform distribution of the weight values in the variable node and the distribution optimization of the weight values on the short cycle. This helps further improve the coding performance.

In at least one embodiment, values of non-zero elements in the circulant permutation sub-matrix are equal. In this way, the value of the non-zero element in the matrix or a value of a non-zero element in a circulant permutation sub-matrix below the row is determined by using a circulant permutation sub-matrix as a unit, to further improve coding performance.

In at least one embodiment, the sending device determines the generator matrix based on a value of N and/or a transmission rate. In this way, accuracy of selecting the generator matrix is improved, and performance of coding and decoding is improved.

In at least one embodiment, a quantity of rows of the first sub-matrix $G_i$ is equal to $m_i$. In response to i being 1, the first sub-matrix $G_i$ is a sub-matrix including first $m_i$ rows of the generator matrix, and $m_i$ is a positive integer less than M. In response to i being greater than 1, the first sub-matrix $G_i$ is a sub-matrix including an $(m_{i-1}+1)^{th}$ row to an $(m_{i-1}+m_i)^{th}$ row of the generator matrix, and $m_i$ is a positive integer less than or equal to a difference between M and $M'_{i-1}$. $M'_{i-1}$ is a sum $\varepsilon_{k=1}^{i-1} m_k$ of lengths of symbol sequences transmitted for first (i−1) times. $m_{i-1}$ is a quantity of rows of a first sub-matrix $G_{i-1}$ used to perform coding modulation on a transmitted symbol sequence $c_{i-1}$ at an $(i-1)^{th}$ time, and is equal to a length of the symbol sequence $c_{i-1}$. In this way, the symbol sequence is transmitted based on the first sub-matrix, so that incremental transmission of the symbol sequence is implemented, and the efficiency of coding modulation is improved.

In at least one embodiment, the sending device determines a value of $m_i$ and/or a value of M based on a channel parameter of a channel. In this way, a success rate of information transmission and efficiency of coding or decoding is improved.

In at least one embodiment, the method further includes: The sending device sends configuration information to a receiving device. The configuration information is used to determine parameter information of the generator matrix or parameter information of a second sub-matrix including some rows of the generator matrix. The second sub-matrix is used to perform demodulation decoding based on symbol sequences received for first i times. The parameter information of the generator matrix includes the value of N and the value of M, and the parameter information of the second sub-matrix includes the value of N and a quantity of rows of the second sub-matrix. In this way, a success rate of decoding is improved.

S803: The sending device sends the symbol sequence to the receiving device through the channel.

In the method shown in FIG. 8, the sending device first performs BPSK mapping on the to-be-transmitted bit sequence to obtain the first sequence. Then, the sending device performs coding modulation on the first sequence based on the generator matrix or the first sub-matrix including some rows of the generator matrix, to obtain the symbol sequence. Then, the sending device sends the symbol sequence to the receiving device through the channel. In this way, coding modulation transmission is implemented, and coding modulation performance is improved.

Figure 9:
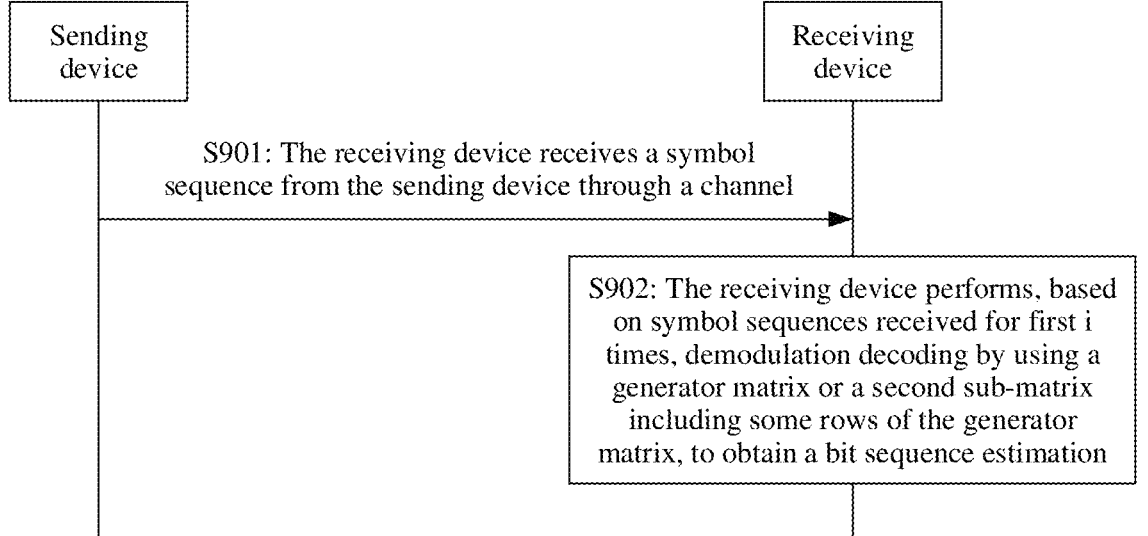
FIG. 9 is a schematic flowchart of another data transmission method according to at least one embodiment.

A decoding process of the receiving device is an inverse process of a coding process. FIG. 9 is a schematic flowchart of another data transmission method according to at least one embodiment. The method is applied to the system shown in FIG. 1, and the method is described by using a receiving device as an execution body. The method shown in FIG. 9 includes the following steps S901 and S902.

S901: The receiving device receives a symbol sequence from a sending device through a channel.

In at least one embodiment, a length $m_i$ of the symbol sequence $y_i$ is a positive integer less than or equal to a maximum quantity M of transmission symbols. i is a receiving time of the received symbol sequence. i is a positive integer less than or equal to M. The symbol sequence $y_i$ is a symbol sequence obtained by performing channel transmission on a symbol sequence $c_i$ obtained by performing coding modulation based on a first sub-matrix $G_i$, or is a symbol sequence obtained by performing channel transmission on a partial symbol sequence $c_i$ selected from symbol sequences obtained by performing coding modulation based on a generator matrix G. In response to a length of the symbol sequence $c_i$ transmitted by the sending device being $m_i$, the length of the symbol sequence $y_i$ received by the receiving device is also $m_i$.

S902: The receiving device performs, based on symbol sequences received for first i times, demodulation decoding by using a generator matrix or a second sub-matrix including some rows of the generator matrix, to obtain a bit sequence estimation.

In at least one embodiment, a location of a non-zero element in each row of the generator matrix is obtained based on a progressive edge-growth algorithm. Values of non-zero elements in each row of the generator matrix are different and each are a weight value in a weight set. A value of a non-zero element in the first row of the generator matrix is a weight value randomly allocated in the weight set. A value of a non-zero element in a row of the generator matrix other than the first row of the generator matrix is related to reference information of the non-zero element, and is in a negative correlation with an evaluation value corresponding to the reference information.

The location of the non-zero element in each row of the generator matrix G is obtained based on the PEG algorithm, so that generation of a short cycle is reduced, and a minimum cycle length of the generated short cycle is lengthened, to improve decoding performance. In addition, a value is assigned to the non-zero element based on an evaluation value of the non-zero element, to help implement uniform distribution of weight values in a variable node and distribution optimization of weight values on the short cycle, so that coding performance is improved.

In at least one embodiment, the reference information of the non-zero element includes a quantity of other non-zero elements, and/or values of the other non-zero elements, and/or a determined sequence number of a location of the non-zero element. Column sequence numbers of the other non-zero elements are the same as a column sequence number of the non-zero element. Row sequence numbers of the other non-zero elements are smaller than a row sequence number of the non-zero element.

In at least one embodiment of the foregoing example, the evaluation value is equal to the quantity of other non-zero elements, or a sum of squares of the values of the other non-zero elements, or the determined sequence number.

The evaluation value determined based on the reference information such as the quantity of other non-zero elements, and/or the values of the other non-zero elements, and/or the determined sequence number of the location of the non-zero element is used to further improve the uniform distribution of the weight values in the variable node and the distribution optimization of the weight values on the short cycle. This helps further improve the coding performance.

In at least one embodiment, a quantity of non-zero elements in each row of the generator matrix is a quantity d of weight values in the weight set. In this way, a transmission rate and efficiency of coding modulation is improved.

In at least one embodiment of the foregoing example, the generator matrix includes P circulant permutation matrix groups. The circulant permutation matrix group includes d circulant permutation sub-matrices. A quantity of rows of the circulant permutation sub-matrix is equal to a quantity of columns of the circulant permutation sub-matrix and is equal to a first ratio of N to d. P is equal to a second ratio of M to the first ratio. Each row of the circulant permutation sub-matrix has a non-zero element. A location of a non-zero element in the first row of the circulant permutation matrix group is obtained based on the progressive edge-growth algorithm. A location of a non-zero element in a row of the circulant permutation sub-matrix other than the first row of the circulant permutation sub-matrix is obtained by performing cyclic shift based on a previous row of the row.

In response to the quantity of non-zero elements in each row of the generator matrix being equal to the quantity d of the weight values in the weight set, an element is selected from the circulant permutation sub-matrix in each row of the generator matrix as a non-zero element, so that locations of the non-zero elements are uniformly allocated, and the transmission rate and efficiency of coding modulation is improved. In addition, the location of the non-zero element in the first row of the circulant permutation matrix group is obtained based on the PEG algorithm. The location of the non-zero element in the row of the circulant permutation sub-matrix other than the first row of the circulant permutation sub-matrix is obtained by performing cyclic shift based on the previous row of the row. In this way, after the location of the non-zero element in the first row is determined, the location of the non-zero element in the row other than the first row of the circulant permutation matrix group is determined. In addition, the cyclic shift enables the non-zero elements in a same circulant permutation sub-matrix to be in different columns, so that the locations of the non-zero elements are uniformly allocated, to help implement uniform distribution of variable node degrees.

In at least one embodiment of the foregoing example, the reference information of the non-zero element includes values of other non-zero elements, and/or a determined sequence number of a location of the non-zero element. Column sequence numbers of the other non-zero elements are the same as a column sequence number of the non-zero element. Row sequence numbers of the other non-zero elements are smaller than a row sequence number of the non-zero element.

In at least one embodiment of the foregoing example, the evaluation value is equal to a sum of squares of the values of the other non-zero elements, or the determined sequence number.

The evaluation value determined based on the reference information such as the values of the other non-zero elements and/or the determined sequence number of the location of the non-zero element is used to further improve the uniform distribution of the weight values in the variable node and the distribution optimization of the weight values on the short cycle. This helps further improve the coding performance.

In at least one embodiment, values of non-zero elements in the circulant permutation sub-matrix are equal. In this way, the value of the non-zero element in the matrix or a value of a non-zero element in a circulant permutation sub-matrix below the row is determined by using a circulant permutation sub-matrix as a unit, to further improve coding performance.

In at least one embodiment, step S902 includes: The receiving device performs, based on the symbol sequences received for the first i times, demodulation decoding by using the generator matrix or the second sub-matrix including some rows of the generator matrix, to obtain first soft information, where a length of the first soft information is N. The receiving device performs outer-code decoding on the first soft information to obtain the bit sequence estimation. In this way, outer-code decoding is performed on the soft information obtained through demodulation decoding, to improve decoding accuracy.

In at least one embodiment, that the receiving device performs outer-code decoding on the first soft information to obtain the bit sequence estimation includes: The receiving device performs outer-code decoding on the first soft information to obtain second soft information. The receiving device performs iterative decoding based on the second soft information, to obtain the bit sequence estimation. In this way, iterative decoding is performed at least once, to further improve decoding accuracy.

In at least one embodiment, the second sub-matrix $G'_i$ is a sub-matrix including first m rows of the generator matrix. In response to i being 1, $m'_i$ is equal to $m_i$, and both $m'_i$ and $m_i$ are positive integers less than M. $m_i$ is the length of the symbol sequence $y_i$. In response to i being greater than 1, $m'_i$ is equal to a sum of $m'_{i-1}$ and $m_i$, and $m_i$ is a positive integer less than or equal to a difference between M and $M'_{i-1}$. $M'_{i-1}$ is equal to a sum $\varepsilon_{k=1}^{i-1} m_k$ of lengths of symbol sequences received for first (i−1) times. $m_{i-1}$ is a quantity of rows of a second sub-matrix $G_{i-1}$ used to perform demodulation decoding at an $(i-1)^{th}$ time based on the symbol sequences received for the first (i−1) times. In this way, demodulation decoding is performed, based on all received symbol sequences, by using the second sub-matrix, so that efficiency of demodulation decoding is improved.

In at least one embodiment, before step S902, the method further includes: The receiving device receives configuration information from the sending device. The configuration information is used to determine parameter information of the generator matrix or parameter information of the second sub-matrix. The parameter information of the generator matrix includes a value of N and a value of M. The parameter information of the second sub-matrix includes the value of N and the quantity of rows of the second sub-matrix. The receiving device determines the parameter information based on the configuration information. In this way, accuracy of obtaining the matrix used for demodulation decoding is improved, and a success rate of decoding is improved.

In the method shown in FIG. 9, after receiving the symbol sequence from the sending device through the channel, the receiving device performs, based on all received symbol sequences, decoding by using the generator matrix or the second sub-matrix including some rows of the generator matrix, to obtain the bit sequence estimation. In this way, demodulation decoding transmission is implemented, and demodulation decoding performance is improved.

The foregoing describes in detail the method in at least one embodiment. The following provides an apparatus in at least one embodiment.

Figure 10:
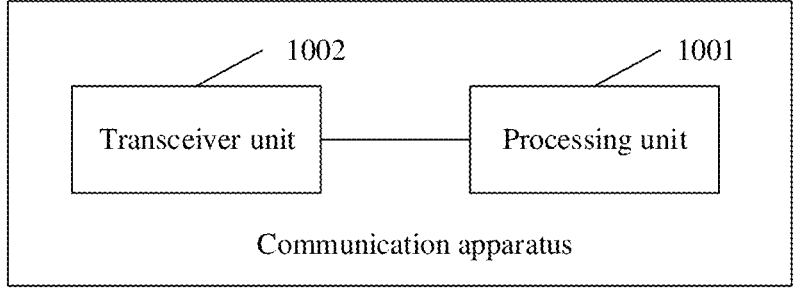
FIG. 10 is a schematic diagram of a structure of a communication apparatus according to at least one embodiment.

FIG. 10 is a schematic diagram of a structure of a communication apparatus according to at least one embodiment. As shown in FIG. 10, the communication apparatus includes a processing unit 1001 and a transceiver unit 1002.

In response to the communication apparatus being a sending device, the processing unit 1001 is configured to BPSK mapping on a to-be-transmitted bit sequence to obtain a first sequence. Each element in the first sequence is 1 or −1, and lengths of both the bit sequence and the first sequence are N.

The processing unit 1001 is further configured to perform coding modulation on the first sequence based on a generator matrix or a first sub-matrix including some rows of the generator matrix, to obtain a symbol sequence $c_i$. A length $m_i$ of the symbol sequence $c_i$ is a positive integer less than or equal to a maximum quantity M of transmission symbols. i is a transmission time of the symbol sequence. i is a positive integer less than or equal to M. A quantity of columns of the generator matrix is N. A quantity of rows of the generator matrix is M. Both M and N are positive integers. A location of a non-zero element in each row of the generator matrix is obtained based on a progressive edge-growth algorithm. Values of non-zero elements in each row of the generator matrix are different and each is a weight value in a weight set. A value of a non-zero element in the first row of the generator matrix is a weight value randomly allocated in the weight set. A value of a non-zero element in a row of the generator matrix other than the first row of the generator matrix is related to reference information of the non-zero element, and is in a negative correlation with an evaluation value corresponding to the reference information.

The transceiver unit 1002 is configured to send the symbol sequence $c_i$ to a receiving device through a channel.

The location of the non-zero element in each row of the generator matrix is obtained based on the PEG algorithm, so that generation of a short cycle is reduced, and a minimum cycle length of the generated short cycle is lengthened, to improve decoding performance. In addition, a value is assigned to the non-zero element based on an evaluation value of the non-zero element, to help implement uniform distribution of weight values in a variable node and distribution optimization of weight values on the short cycle, so that coding performance is improved.

In at least one embodiment, the reference information of the non-zero element includes a quantity of other non-zero elements, and/or values of the other non-zero elements, and/or a determined sequence number of a location of the non-zero element. Column sequence numbers of the other non-zero elements are the same as a column sequence number of the non-zero element. Row sequence numbers of the other non-zero elements are smaller than a row sequence number of the non-zero element.

In at least one embodiment of the foregoing example, the evaluation value is equal to the quantity of other non-zero elements, or a sum of squares of the values of the other non-zero elements, or the determined sequence number.

The evaluation value determined based on the reference information such as the quantity of other non-zero elements, and/or the values of the other non-zero elements, and/or the determined sequence number of the location of the non-zero element is used to further improve the uniform distribution of the weight values in the variable node and the distribution optimization of the weight values on the short cycle. This helps further improve the coding performance.

In at least one embodiment, a quantity of non-zero elements in each row of the generator matrix is a quantity d of weight values in the weight set. In this way, a transmission rate and efficiency of coding modulation is improved.

In at least one embodiment, the generator matrix includes P circulant permutation matrix groups. The circulant permutation matrix group includes d circulant permutation sub-matrices. A quantity of rows of the circulant permutation sub-matrix is equal to a quantity of columns of the circulant permutation sub-matrix and is equal to a first ratio of N to d. P is equal to a second ratio of M to the first ratio. Each row of the circulant permutation sub-matrix has a non-zero element. A location of a non-zero element in the first row of the circulant permutation matrix group is obtained based on the progressive edge-growth algorithm. A location of a non-zero element in a row of the circulant permutation sub-matrix other than the first row of the circulant permutation sub-matrix is obtained by performing cyclic shift based on a previous row of the row.

In response to the quantity of non-zero elements in each row of the generator matrix being equal to the quantity d of the weight values in the weight set, an element is selected from the circulant permutation sub-matrix in each row of the generator matrix as a non-zero element, so that locations of the non-zero elements are uniformly allocated, and the transmission rate and efficiency of coding modulation is improved. The location of the non-zero element in the first row of the circulant permutation matrix group is obtained based on the PEG algorithm. The location of the non-zero element in the row of the circulant permutation sub-matrix other than the first row of the circulant permutation sub-matrix is obtained by performing cyclic shift based on the previous row of the row. In this way, after the location of the non-zero element in the first row is determined, the location of the non-zero element in the row other than the first row of the circulant permutation matrix group is determined. In addition, the cyclic shift enables the non-zero elements in a same circulant permutation sub-matrix to be in different columns, so that the locations of the non-zero elements are uniformly allocated, to help implement uniform distribution of variable node degrees and distribution optimization of the weight values on the short cycle.

In at least one embodiment of the foregoing example, the reference information of the non-zero element includes values of other non-zero elements, and/or a determined sequence number of a location of the non-zero element. Column sequence numbers of the other non-zero elements are the same as a column sequence number of the non-zero element. Row sequence numbers of the other non-zero elements are smaller than a row sequence number of the non-zero element.

In at least one embodiment of the foregoing example, the evaluation value is equal to a sum of squares of the values of the other non-zero elements, or the determined sequence number.

The evaluation value determined based on the reference information such as the values of the other non-zero elements and/or the determined sequence number of the location of the non-zero element is used to further improve the uniform distribution of the weight values in the variable node and the distribution optimization of the weight values on the short cycle. This helps further improve the coding performance.

In at least one embodiment, values of non-zero elements in the circulant permutation sub-matrix are equal. In this way, the value of the non-zero element in the matrix or a value of a non-zero element in a circulant permutation sub-matrix below the row is determined by using a circulant permutation sub-matrix as a unit, to further improve coding performance.

In at least one embodiment, the processing unit 1001 is further configured to determine the generator matrix based on a value of N and/or a transmission rate. In this way, accuracy of selecting the generator matrix is improved, and performance of coding and decoding is improved.

In at least one embodiment, the processing unit 1001 is specifically configured to: perform concatenated outer-code coding on the to-be-transmitted bit sequence to obtain a second sequence, where a length of the second sequence is N; and perform BPSK mapping on the second sequence to obtain the first sequence. In this way, concatenated outer-code coding is performed on the bit sequence, to improve coding performance.

In at least one embodiment, a quantity of rows of the first sub-matrix $G_i$ is equal to $m_i$. In response to i being 1, the first sub-matrix $G_i$ is a sub-matrix including first $m_i$ rows of the generator matrix, and $m_i$ is a positive integer less than M. In response to i being greater than 1, the first sub-matrix $G_i$ is a sub-matrix including the $(m_{i-1}+1)^{th}$ row to the $(m_{i-1}+m_i)^{th}$ row of the generator matrix, and $m_i$ is a positive integer less than or equal to a difference between M and $M'_{i-1}$. $M'_{i-1}$ is a sum $\varepsilon_{k=1}^{i-1} m_k$ of lengths of symbol sequences transmitted for first (i−1) times. $m_{i-1}$ is a quantity of rows of a first sub-matrix $c_{i-1}$ used to perform coding modulation on a transmitted symbol sequence $G_{i-1}$ at an $(i-1)^{th}$ time, and is equal to a length of the symbol sequence $c_{i-1}$.

In at least one embodiment, the processing unit 1001 is further configured to determine a value of $m_i$ and/or a value of M based on a channel parameter of the channel. In this way, a success rate of information transmission and efficiency of coding or decoding is improved.

In at least one embodiment, the transceiver unit 1002 is configured to send configuration information to the receiving device. The configuration information is used to determine parameter information of the generator matrix or parameter information of a second sub-matrix including some rows of the generator matrix. The second sub-matrix is used to perform demodulation decoding based on symbol sequences received for first i times. The parameter information of the generator matrix includes the value of N and the value of M, and the parameter information of the second sub-matrix includes the value of N and a quantity of rows of the second sub-matrix. In this way, accuracy of obtaining the matrix used for demodulation decoding is improved, and a success rate of demodulation decoding is improved.

In response to the communication apparatus being a receiving device, the transceiver unit 1002 is configured to receive a symbol sequence $y_i$ from a sending device through a channel. A length $y_i$ of the symbol sequence $m_i$ is a positive integer less than or equal to a maximum quantity M of transmission symbols. i is a receiving time of the received symbol sequence. i is a positive integer less than or equal to M.

The processing unit 1001 is configured to perform based on symbol sequences received for first i times, demodulation decoding by using a generator matrix or a second sub-matrix including some rows of the generator matrix, to obtain a bit sequence estimation. A length of the bit sequence estimation is a quantity N of columns of the generator matrix. A quantity of rows of the generator matrix is M. Both M and N are positive integers. A location of a non-zero element in each row of the generator matrix is obtained based on a progressive edge-growth algorithm. Values of non-zero elements in each row of the generator matrix are different and each is a weight value in a weight set. A value of a non-zero element in the first row of the generator matrix is a weight value randomly allocated in the weight set. A value of a non-zero element of a row of the generator matrix other than the first row of the generator matrix is related to reference information of the non-zero element, and is in a negative correlation with an evaluation value corresponding to the reference information.

The location of the non-zero element in each row of the generator matrix G is obtained based on the PEG algorithm, so that generation of a short cycle is reduced, and a minimum cycle length of the generated short cycle is lengthened, to improve decoding performance. In addition, a value is assigned to the non-zero element based on an evaluation value of the non-zero element, to help implement uniform distribution of weight values in the variable node and distribution optimization of the weight values on the short cycle, so that coding performance is improved.

In at least one embodiment, the reference information of the non-zero element includes a quantity of other non-zero elements, and/or values of the other non-zero elements, and/or a determined sequence number of a location of the non-zero element. Column sequence numbers of the other non-zero elements are the same as a column sequence number of the non-zero element. Row sequence numbers of the other non-zero elements are smaller than a row sequence number of the non-zero element.

In at least one embodiment of the foregoing example, the evaluation value is equal to the quantity of other non-zero elements, or a sum of squares of the values of the other non-zero elements, or the determined sequence number.

The evaluation value determined based on the reference information such as the quantity of other non-zero elements, and/or the values of the other non-zero elements, and/or the determined sequence number of the location of the non-zero element is used to further improve the uniform distribution of the weight values in the variable node and the distribution optimization of the weight values on the short cycle. This helps further improve the coding performance.

In at least one embodiment, a quantity of non-zero elements in each row of the generator matrix is a quantity d of weight values in the weight set. In this way, a transmission rate and efficiency of coding modulation is improved.

In at least one embodiment, the generator matrix includes P circulant permutation matrix groups. The circulant permutation matrix group includes d circulant permutation sub-matrices. A quantity of rows of the circulant permutation sub-matrix is equal to a quantity of columns of the circulant permutation sub-matrix and is equal to a first ratio of N to d. P is equal to a second ratio of M to the first ratio. Each row of the circulant permutation sub-matrix has a non-zero element. A location of a non-zero element in the first row of the circulant permutation matrix group is obtained based on the progressive edge-growth algorithm. A location of a non-zero element in a row of the circulant permutation sub-matrix other than the first row of the circulant permutation sub-matrix is obtained by performing cyclic shift based on a previous row of the row.

In response to the quantity of non-zero elements in each row of the generator matrix being equal to the quantity d of the weight values in the weight set, an element is selected from the circulant permutation sub-matrix in each row of the generator matrix as a non-zero element, so that locations of the non-zero elements are uniformly allocated, and the transmission rate and efficiency of coding modulation is improved. The location of the non-zero element in the first row of the circulant permutation matrix group is obtained based on the PEG algorithm. The location of the non-zero element in the row of the circulant permutation sub-matrix other than the first row of the circulant permutation sub-matrix is obtained by performing cyclic shift based on the previous row of the row. In this way, after the location of the non-zero element in the first row is determined, the location of the non-zero element in the row other than the first row of the circulant permutation matrix group is determined. In addition, the cyclic shift enables the non-zero elements in a same circulant permutation sub-matrix to be in different columns, so that the locations of the non-zero elements are uniformly allocated, to help implement uniform distribution of variable node degrees.

In at least one embodiment of the foregoing example, the reference information of the non-zero element includes values of other non-zero elements, and/or a determined sequence number of a location of the non-zero element. Column sequence numbers of the other non-zero elements are the same as a column sequence number of the non-zero element. Row sequence numbers of the other non-zero elements are smaller than a row sequence number of the non-zero element.

In at least one embodiment of the foregoing example, the evaluation value is equal to a sum of squares of the values of the other non-zero elements, or the determined sequence number.

The evaluation value determined based on the reference information such as the values of the other non-zero elements and/or the determined sequence number of the location of the non-zero element is used to further improve the uniform distribution of the weight values in the variable node and the distribution optimization of the weight values on the short cycle. This helps further improve the coding performance.

In at least one embodiment, values of non-zero elements in the circulant permutation sub-matrix are equal. In this way, the value of the non-zero element in the matrix or a value of a non-zero element in a circulant permutation sub-matrix below the row is determined by using a circulant permutation sub-matrix as a unit, to further improve coding performance.

In at least one embodiment, the processing unit 1001 is specifically configured to: perform, based on the symbol sequences received for the first i times, demodulation decoding by using the generator matrix or the second sub-matrix including some rows of the generator matrix, to obtain first soft information, where a length of the first soft information is N; and perform outer-code decoding on the first soft information to obtain the bit sequence estimation. In this way, outer-code decoding is performed on the soft information obtained through demodulation decoding, to improve decoding accuracy.

In at least one embodiment, the processing unit 1001 is specifically configured to: perform outer-code decoding on the first soft information to obtain second soft information; and perform iterative decoding based on the second soft information, to obtain the bit sequence estimation. In this way, iterative decoding is performed at least once, to further improve decoding accuracy.

In at least one embodiment, the second sub-matrix $G'_i$ is a sub-matrix including first $m'_i$ rows of the generator matrix. In response to i being 1, $m'_i$ is equal to $m_i$, and both $m'_i$ and $m_i$ are positive integers less than M. In response to i being greater than 1, $m'_i$ is equal to a sum of $m'_{i-1}$ and $m_i$, and $m_i$ is a positive integer less than or equal to a difference between M and $M'_{i-1}$. $M'_{i-1}$ is equal to a sum $E_{k=1}^{i-1} m_k$ of lengths of symbol sequences received for first (i–1) times. $m'_{i-1}$ is a quantity of rows of a second sub-matrix $G'_{i-1}$ used to perform demodulation decoding at an $(i-1)^{th}$ time based on the symbol sequences received for the first (i–1) times. In this way, demodulation decoding is performed, based on all received symbol sequences, by using the second sub-matrix, so that efficiency of demodulation decoding is improved.

In at least one embodiment, the transceiver unit 1002 is further configured to receive configuration information from the sending device. The configuration information is used to determine parameter information of the generator matrix or parameter information of the second sub-matrix. The parameter information of the generator matrix includes a value of N and a value of M. The parameter information of the second sub-matrix includes the value of N and the quantity of rows of the second sub-matrix. The processing unit 1001 is further configured to determine the parameter information based on the configuration information. In this way, accuracy of obtaining the matrix used for demodulation decoding is improved, and a success rate of decoding is improved.

For implementations of the units, refer to corresponding descriptions in the method embodiment shown in FIG. 8 or FIG. 9.

Figure 11:
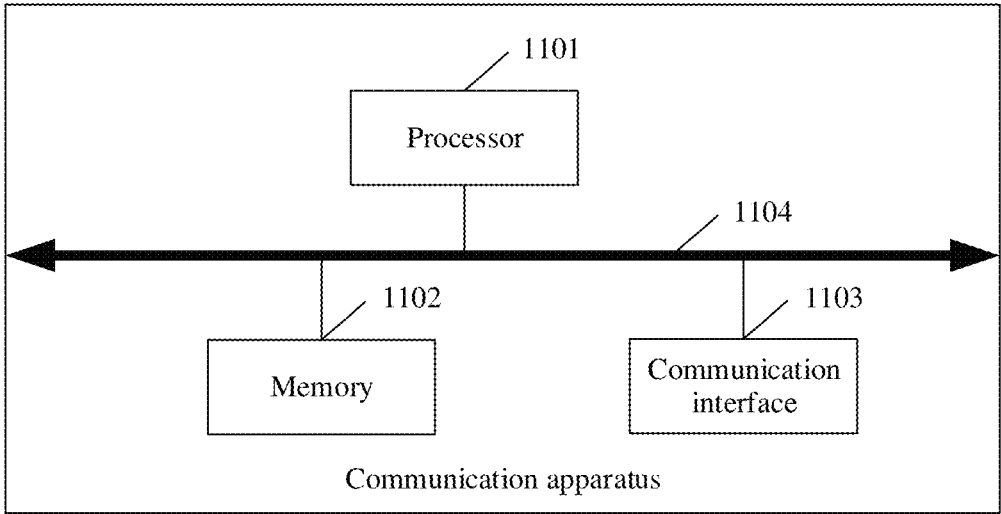
FIG. 11 is a schematic diagram of a structure of another communication apparatus according to at least one embodiment.

FIG. 11 shows another communication apparatus according to at least one embodiment. The communication apparatus includes a processor 1101, a memory 1102, and a communication interface 1103. The processor 1101, the memory 1102, and the communication interface 1103 are connected to each other through a bus 1104. The memory 1102 includes, but is not limited to, a random access memory (random access memory, RAM), a read-only memory (read-only memory, ROM), an erasable programmable read-only memory (erasable programmable read-only memory, EPROM), or a portable read-only memory (compact disc read-only memory, CD-ROM). The memory 1102 is configured to store related instructions and data. The communication interface 1103 is configured to receive and send data. The processor 1101 is one or more central processing units (central processing unit, CPU). In response to the processor 1101 being one CPU, the CPU is a single-core CPU or a multi-core CPU.

In response to the communication apparatus being a sending device, the processor 1101 is configured to read program code stored in the memory 1102, to perform the following operations:

performing BPSK mapping on a to-be-transmitted bit sequence to obtain a first sequence, where each element in the first sequence is 1 or –1, and lengths of both the bit sequence and the first sequence are N;

performing, coding modulation on the first sequence based on a generator matrix or a first sub-matrix including some rows of the generator matrix, to obtain a symbol sequence $c_i$, where a length $m_i$ of the symbol sequence $c_i$ is a positive integer less than or equal to a maximum quantity M of transmission symbols, i is a transmission time of the symbol sequence, i is a positive integer less than or equal to M, a quantity of columns of the generator matrix is N, a quantity of rows of the generator matrix is M, both M and N are positive integers, a location of a non-zero element in each row of the generator matrix is obtained based on a progressive edge-growth algorithm, values of non-zero elements in each row of the generator matrix are different and each are a weight value in a weight set, a value of a non-zero element in the first row of the generator matrix is a weight value randomly allocated in the weight set, and a value of a non-zero element in a row of the generator matrix other than the first row of the generator matrix is related to reference information of the non-zero element, and is in a negative correlation with an evaluation value corresponding to the reference information; and sending the symbol sequence $c_i$ to a receiving device through a channel.

In at least one embodiment, the reference information of the non-zero element includes a quantity of other non-zero elements, and/or values of the other non-zero elements, and/or a determined sequence number of a location of the non-zero element. Column sequence numbers of the other non-zero elements are the same as a column sequence number of the non-zero element. Row sequence numbers of the other non-zero elements are smaller than a row sequence number of the non-zero element.

In at least one embodiment of the foregoing example, the evaluation value is equal to the quantity of other non-zero elements, or a sum of squares of the values of the other non-zero elements, or the determined sequence number.

In at least one embodiment, a quantity of non-zero elements in each row of the generator matrix is a quantity d of weight values in the weight set.

In at least one embodiment, the generator matrix includes P circulant permutation matrix groups. The circulant permutation matrix group includes d circulant permutation sub-matrices. A quantity of rows of the circulant permutation sub-matrix is equal to a quantity of columns of the circulant permutation sub-matrix and is equal to a first ratio of N to d. P is equal to a second ratio of M to the first ratio. Each row of the circulant permutation sub-matrix has a non-zero element. A location of a non-zero element in the first row of the circulant permutation matrix group is obtained based on the progressive edge-growth algorithm. A location of a non-zero element in a row of the circulant permutation sub-matrix other than the first row of the circulant permutation sub-matrix is obtained by performing cyclic shift based on a previous row of the row.

In at least one embodiment of the foregoing example, the reference information of the non-zero element includes values of other non-zero elements, and/or a determined sequence number of a location of the non-zero element. Column sequence numbers of the other non-zero elements are the same as a column sequence number of the non-zero element. Row sequence numbers of the other non-zero elements are smaller than a row sequence number of the non-zero element.

In at least one embodiment of the foregoing example, the evaluation value is equal to a sum of squares of the values of the other non-zero elements, or the determined sequence number.

In at least one embodiment, values of non-zero elements in the circulant permutation sub-matrix are equal.

In at least one embodiment, the processor 1101 is further configured to perform the following operations:

determining the generator matrix based on a value of N and/or a transmission rate.

In at least one embodiment, in an aspect of the performing BPSK mapping on a to-be-transmitted bit sequence to obtain a first sequence, the processor 1101 is specifically configured to perform the following operations:

performing concatenated outer-code coding on the to-be-transmitted bit sequence to obtain a second sequence, where a length of the second sequence is N; and performing BPSK mapping on the second sequence to obtain the first sequence.

In at least one embodiment, a quantity of rows of the first sub-matrix $G_i$ is equal to $m_i$. In response to i being 1, the first sub-matrix $G_i$ is a sub-matrix including first $m_i$ rows of the generator matrix, and $m_i$ is a positive integer less than M. In response to i being greater than 1, the first sub-matrix $G_i$ is a sub-matrix including the $(m_{i-1}+1)^{th}$ row to the $(m_{i-1}+m_i)^{th}$ row of the generator matrix, and $m_i$ is a positive integer less than or equal to a difference between M and $M'_{i-1}$. $M'_{i-1}$ is a sum $\varepsilon_{k=1}^{i-1} m_k$ of lengths of symbol sequences transmitted for first (i–1) times. $m_{i-1}$ is a quantity of rows of a first sub-matrix $G_{i-1}$ used to perform coding modulation on a transmitted symbol sequence $c_{i-1}$ at an $(i-1)^{th}$ time, and is equal to a length of the symbol sequence $c_{i-1}$.

In at least one embodiment, the processor 1101 is further configured to perform the following operations:

determining a value of $m_i$ and/or a value of M based on a channel parameter of the channel.

In at least one embodiment, the processor 1101 is further configured to perform the following operation:

sending configuration information to the receiving device, where the configuration information is used to determine parameter information of the generator matrix or parameter information of a second sub-matrix including some rows of the generator matrix, the second sub-matrix is used to perform demodulation decoding based on symbol sequences received for first i times, the parameter information of the generator matrix includes the value of N and the value of M, and the parameter information of the second sub-matrix includes the value of N and a quantity of rows of the second sub-matrix.

In response to the communication apparatus being a receiving device, the processor 1101 is configured to read program code stored in the memory 1102, to perform the following operations:

receiving a symbol sequence $y_i$ from a sending device through a channel, where a length $m_i$ of the symbol sequence $y_i$ is a positive integer less than or equal to a maximum quantity M of transmission symbols, i is a receiving time of the received symbol sequence, and i is a positive integer less than or equal to M; and performing, based on symbol sequences received for first i times, demodulation decoding by using a generator matrix or a second sub-matrix including some rows of the generator matrix, to obtain a bit sequence estimation, where a length of the bit sequence estimation is a quantity N of columns of the generator matrix, a quantity of rows of the generator matrix is M, both M and N are positive integers, a location of a non-zero element in each row of the generator matrix is obtained based on a progressive edge-growth algorithm, values of non-zero elements in each row of the generator matrix are different and each are a weight value in a weight set, a value of a non-zero element in the first row of the generator matrix is a weight value randomly allocated in the weight set, and a value of a non-zero element of a row of the generator matrix other than the first row of the generator matrix is related to reference information of the non-zero element, and is in a negative correlation with an evaluation value corresponding to the reference information.

In at least one embodiment, the reference information of the non-zero element includes a quantity of other non-zero elements, and/or values of the other non-zero elements, and/or a determined sequence number of a location of the non-zero element. Column sequence numbers of the other non-zero elements are the same as a column sequence number of the non-zero element. Row sequence numbers of the other non-zero elements are smaller than a row sequence number of the non-zero element.

In at least one embodiment of the foregoing example, the evaluation value is equal to the quantity of other non-zero elements, or a sum of squares of the values of the other non-zero elements, or the determined sequence number.

In at least one embodiment, a quantity of non-zero elements in each row of the generator matrix is a quantity d of weight values in the weight set.

In at least one embodiment of the foregoing example, the generator matrix includes P circulant permutation matrix groups. The circulant permutation matrix group includes d circulant permutation sub-matrices. A quantity of rows of the circulant permutation sub-matrix is equal to a quantity of columns of the circulant permutation sub-matrix and is equal to a first ratio of N to d. P is equal to a second ratio of M to the first ratio. Each row of the circulant permutation sub-matrix has a non-zero element. A location of a non-zero element in the first row of the circulant permutation matrix group is obtained based on the progressive edge-growth algorithm. A location of a non-zero element in a row of the circulant permutation sub-matrix other than the first row of the circulant permutation sub-matrix is obtained by performing cyclic shift based on a previous row of the row.

In at least one embodiment of the foregoing example, the reference information of the non-zero element includes values of other non-zero elements, and/or a determined sequence number of a location of the non-zero element. Column sequence numbers of the other non-zero elements are the same as a column sequence number of the non-zero element. Row sequence numbers of the other non-zero elements are smaller than a row sequence number of the non-zero element.

In at least one embodiment of the foregoing example, the evaluation value is equal to a sum of squares of the values of the other non-zero elements, or the determined sequence number.

In at least one embodiment, values of non-zero elements in the circulant permutation sub-matrix are equal.

In at least one embodiment, in an aspect of the performing, based on symbol sequences received for first i times, demodulation decoding by using a generator matrix or a second sub-matrix including some rows of the generator matrix, to obtain a bit sequence estimation, the processor 1101 is specifically configured to perform the following operations:

performing, based on the symbol sequences received for the first i times, demodulation decoding by using the generator matrix or the second sub-matrix including some rows of the generator matrix, to obtain first soft information, where a length of the first soft information is N; and performing outer-code decoding on the first soft information to obtain the bit sequence estimation.

In at least one embodiment, in an aspect of the performing outer-code decoding on the first soft information to obtain the bit sequence estimation, the processor 1101 is specifically configured to perform the following operations:

performing outer-code decoding on the first soft information to obtain second soft information; and performing iterative decoding based on the second soft information, to obtain the bit sequence estimation.

In at least one embodiment, the second sub-matrix $G'_i$ is a sub-matrix including first $m'_i$ rows of the generator matrix. In response to i being 1, $m'_i$ is equal to $m_i$, and both $m'_i$ and $m_i$ are positive integers less than M. In response to i being greater than 1, $m'_i$ is equal to a sum of $m'_{i-1}$ and $m_i$, and $m_i$ is a positive integer less than or equal to a difference between M and $M'_{i-1}$. $M'_{i-1}$ is equal to a sum $E_{k=1}^{i-1} m_k$ of lengths of symbol sequences received for first (i−1) times. $m_{i-1}$ is a quantity of rows of a second sub-matrix $G'_{i-1}$ used to perform demodulation decoding at an $(i-1)^{th}$ time based on the symbol sequences received for the first (i−1) times.

In at least one embodiment, before the receiving device performs, based on the symbol sequences received for the first i times, demodulation decoding by using the generator matrix or the second sub-matrix including some rows of the generator matrix, the processor 1101 is further configured to perform the following operations:

receiving configuration information from the sending device, where the configuration information is used to determine parameter information of the generator matrix or parameter information of the second sub-matrix, the parameter information of the generator matrix includes a value of N and a value of M, and the parameter information of the second sub-matrix includes the value of N and the quantity of rows of the second sub-matrix; and determining the parameter information based on the configuration information.

For implementation of each operation, refer to corresponding descriptions in the method embodiment shown in FIG. 8 or FIG. 9.

At least one embodiment further provides a first type of chip, including a processor and a memory. The processor is configured to invoke instructions from the memory, and run the instructions stored in the memory, to enable a device in which the chip is installed to perform the method shown in FIG. 8 or FIG. 9.

At least one embodiment further provides a second type of chip, including an input interface, an output interface, and a processing circuit. The input interface, the output interface, and the processing circuit are connected to each other through an internal connection path. The processing circuit is configured to perform the method shown in FIG. 8 or FIG. 9.

At least one embodiment further provides a third type of chip, including an input interface, an output interface, a processor, and optionally, a memory. The input interface, the output interface, the processor, and the memory are connected to each other through an internal connection path. The processor is configured to execute code in the memory. In response to the code being executed, the processor is configured to perform the method shown in FIG. 8 or FIG. 9.

At least one embodiment further provides a chip system. The chip system includes at least one processor, a memory, and an interface circuit. The memory, a transceiver, and the at least one processor are connected to each other through lines. At least one memory stores instructions. In response to the instructions being executed by the processor, the method procedure shown in FIG. 8 or FIG. 9 is implemented.

At least one embodiment further provides a computer-readable storage medium. The computer-readable storage medium stores instructions. In response to the instructions being run on a computer, the method procedure shown in FIG. 8 or FIG. 9 is implemented.

At least one embodiment further provides a computer program product. The computer program product is configured to store a computer program. In response to the computer program being run on a computer, the method procedure shown in FIG. 8 or FIG. 9 is implemented.

In conclusion, according to at least one embodiment, a sending device performs coding modulation based on a generator matrix or a first sub-matrix including some rows of the generator matrix. Then, a symbol sequence obtained through coding modulation is sent to a receiving device, to implement coding modulation transmission. A location of a non-zero element in each row of a generator matrix is obtained based on a PEG algorithm, so that generation of a short cycle is reduced, and a minimum cycle length of the generated short cycle is lengthened, to improve decoding performance. In addition, a value is assigned to the non-zero element based on an evaluation value of the non-zero element, to help implement uniform distribution of weight values in a variable node and distribution optimization of weight values on the short cycle, so that coding modulation performance is improved.

All or some of the foregoing embodiments are implemented by software, hardware, firmware, or any combination thereof. In response to software being used to implement the embodiments, all or some of the embodiments are implemented in a form of a computer instruction product. In response to the computer instructions being loaded and executed on a computer, all or some of the processes or functions described in at least one embodiment are implemented. The computer is a general-purpose computer, a dedicated computer, a computer network, or another programmable apparatus. The computer instructions are stored in a computer-readable storage medium, or are transmitted through a computer-readable storage medium. The computer-readable storage medium is any usable medium accessible by the computer, or a data storage device, such as a server or a data center that integrates one or more usable media. The usable medium is a magnetic medium (for example, a floppy disk, a hard disk, or a magnetic tape), an optical medium (for example, a DVD), a semiconductor medium (for example, a solid state disk (solid state disk, SSD)), or the like.

A sequence of the steps in the method embodiments is adjusted, or the steps are combined or removed according to an actual usage.

The modules in the apparatus embodiments are combined, divided, or removed according to an actual usage.

What is claimed is:

1. A data reception method, comprising:

performing, by a sending device, Binary Phase Shift Keying (BPSK) mapping on a to-be-transmitted bit sequence to obtain a first sequence, wherein each element in the first sequence is 1 or −1, and lengths of both the bit sequence and the first sequence are N;

performing, by the sending device, coding modulation on the first sequence based on a generator matrix or a first sub-matrix including some rows of the generator matrix, to obtain a symbol sequence $c_i$, wherein a length $m_i$ of the symbol sequence $c_i$ is a positive integer less than or equal to a maximum quantity M of transmission symbols, i is a transmission time of the symbol sequence, i is a positive integer less than or equal to M, a quantity of columns of the generator matrix is N, a quantity of rows of the generator matrix is M, both M and N are positive integers, a location of a non-zero element in each row of the generator matrix is obtained based on a progressive edge-growth algorithm, values of the non-zero element in each row of the generator matrix are different and each are a weight value in a weight set, a value of a non-zero element in a first row of the generator matrix is the weight value randomly allocated in the weight set, and a value of a non-zero element in a row of the generator matrix other than the first row of the generator matrix is related to reference information of the non-zero element, and is in a negative correlation with an evaluation value corresponding to the reference information in the row of the generator matrix other than the first row; and sending, by the sending device, the symbol sequence $c_i$ to a receiving device through a channel;

wherein the reference information of the non-zero element in the row of the generator matrix other than the first row includes a quantity of other non-zero elements, values of the other non-zero elements, and/or a determined sequence number of a location of the non-zero element, wherein column sequence numbers of the other non-zero elements are the same as a column sequence number of the non-zero element in the row of the generator matrix other than the first row, and row sequence numbers of the other non-zero elements are smaller than a row sequence number of the non-zero element in the row of the generator matrix other than the first row.

2. The method according to claim 1, wherein the performing coding modulation on the first sequence based on the generator matrix having the value of the non-zero element in the row of the generator matrix other than the first row of the generator matrix that is in the negative correlation with the evaluation value corresponding to the reference information includes performing coding modulation on the first sequence based on the generator matrix having the value of the non-zero element in the row of the generator matrix other than the first row of the generator matrix with the evaluation value being equal to the quantity of other non-zero elements, or a sum of squares of the values of the other non-zero elements, or the determined sequence number.

3. The method according to claim 1, wherein the performing coding modulation on the first sequence based on the generator matrix includes performing coding modulation on the first sequence based on the generator matrix having a quantity of non-zero elements in each row of the generator matrix that is a quantity d of weight values in the weight set.

4. The method according to claim 3, wherein the performing coding modulation on the first sequence based on the generator matrix includes performing coding modulation on the first sequence based on the generator matrix that includes P circulant permutation matrix groups, and the P circulant permutation matrix groups include d circulant permutation sub-matrices, wherein a quantity of rows of the d circulant permutation sub-matrices is equal to a quantity of columns of the d circulant permutation sub-matrices and is equal to a first ratio of N to d, P is equal to a second ratio of M to the first ratio, each row of the d circulant permutation sub-matrices has a non-zero element, the location of the non-zero element in the first row of the P circulant permutation matrix groups is obtained based on the progressive edge-growth algorithm, and the location of the non-zero element in a row of the d circulant permutation sub-matrices other than the first row of the d circulant permutation sub-matrices is obtained by performing cyclic shift based on a previous row of a row.

5. The method according to claim 4, wherein the performing coding modulation on the first sequence based on the generator matrix having the value of the non-zero element in the row of the generator matrix other than the first row of the generator matrix related to the reference information of the non-zero element includes performing coding modulation on the first sequence based on the generator matrix having the value of the non-zero element in the row of the generator matrix other than the first row of the generator matrix related to the reference information of the non-zero element that includes the values of the other non-zero elements, and/or the determined sequence number of the location of the non-zero element, wherein column sequence numbers of the other non-zero elements are the same as a column sequence number of the non-zero element, and row sequence numbers of the other non-zero elements are smaller than a row sequence number of the non-zero element.

6. The method according to claim 5, wherein the performing coding modulation on the first sequence based on the generator matrix having the value of the non-zero element in the row of the generator matrix other than the first row of the generator matrix that is in the negative correlation with the evaluation value corresponding to the reference information includes performing coding modulation on the first sequence based on the generator matrix having the value of the non-zero element in the row of the generator matrix other than the first row of the generator matrix with the evaluation value being equal to a sum of squares of the values of the other non-zero elements, or the determined sequence number.

7. The method according to claim 5, wherein the performing coding modulation on the first sequence based on the generator matrix having the value of the non-zero element in the row of the generator matrix other than the first row of the generator matrix related to the reference information of the non-zero element that includes the values of the other non-zero elements includes performing coding modulation on the first sequence based on the generator matrix having the value of the non-zero element in the row of the generator matrix other than the first row of the generator matrix related to the reference information of the non-zero element that includes values of non-zero elements in the d circulant permutation sub-matrices that are equal.

8. A data transmission method, comprising:

receiving, by a receiving device, a symbol sequence $y_i$ from a sending device through a channel, wherein a length $m_i$ of the symbol sequence $y_i$ is a positive integer less than or equal to a maximum quantity M of transmission symbols, i is a receiving time of a received symbol sequence, and i is a positive integer less than or equal to M; and performing, by the receiving device based on symbol sequences received for first i times, demodulation decoding by using a generator matrix or a second sub-matrix including some rows of the generator matrix, to obtain a bit sequence estimation, wherein a length of the bit sequence estimation is a quantity N of columns of the generator matrix, a quantity of rows of the generator matrix is M, both M and N are positive integers, a location of non-zero elements in each row of the generator matrix is obtained based on a progressive edge-growth algorithm, values of the non-zero elements in each row of the generator matrix are different and each are a weight value in a weight set, a value of a non-zero element in a first row of the generator matrix is the weight value randomly allocated in the weight set, and a value of a non-zero element of a row of the generator matrix other than the first row of the generator matrix is related to reference information of the non-zero element, and is in a negative correlation with an evaluation value corresponding to the reference information in the row of the generator matrix other than the first row;

wherein the reference information of the non-zero element in the row of the generator matrix other than the first row includes a quantity of other non-zero elements, values of the other non-zero elements, and/or a determined sequence number of a location of the non-zero element, wherein column sequence numbers of the other non-zero elements are the same as a column sequence number of the non-zero element in the row of the generator matrix other than the first row, and row sequence numbers of the other non-zero elements are smaller than a row sequence number of the non-zero element in the row of the generator matrix other than the first row.

9. The method according to claim 8, wherein the performing demodulation decoding by using the generator matrix having the value of the non-zero element of the row of the generator matrix other than the first row of the generator matrix that is in the negative correlation with the evaluation value corresponding to the reference information includes performing demodulation decoding by using the generator matrix having the value of the non-zero element of the row of the generator matrix other than the first row of the generator matrix that is in the negative correlation with the evaluation value that is equal to the quantity of the other non-zero elements, or a sum of squares of the values of the other non-zero elements, or the determined sequence number.

10. The method according to claim 8, wherein the performing demodulation decoding by using the generator matrix includes performing demodulation decoding by using the generator matrix having a quantity of the non-zero elements in each row of the generator matrix is a quantity d of weight values in the weight set.

11. The method according to claim 10, wherein the performing demodulation decoding by using the generator matrix includes performing demodulation decoding by using the generator matrix that includes P circulant permutation matrix groups, and the P circulant permutation matrix groups comprise d circulant permutation sub-matrices, wherein a quantity of rows of the d circulant permutation sub-matrices is equal to a quantity of columns of the d circulant permutation sub-matrices and is equal to a first ratio of N to d, P is equal to a second ratio of M to the first ratio, each row of the d circulant permutation sub-matrices has a non-zero element, the location of a non-zero element in the first row of the P circulant permutation matrix groups are obtained based on the progressive edge-growth algorithm, and the location of a non-zero element in a row of the d circulant permutation sub-matrices other than the first row of the d circulant permutation sub-matrices is obtained by performing cyclic shift based on a previous row of a row.

12. The method according to claim 11, wherein the performing demodulation decoding by using the generator matrix having the value of the non-zero element of the row of the generator matrix other than the first row of the generator matrix that is related to the reference information of the non-zero element includes performing demodulation decoding by using the generator matrix having the value of the non-zero element of the row of the generator matrix other than the first row of the generator matrix that is related to the reference information of the non-zero element that includes values of other non-zero elements, and/or the determined sequence number of the location of the non-zero element, wherein column sequence numbers of the other non-zero elements are the same as a column sequence number of the non-zero element, and row sequence numbers of the other non-zero elements are smaller than a row sequence number of the non-zero element.

13. A device, comprising:

a non-transitory computer-readable storage medium storing a program;

a processor connected to the non-transitory computer-readable storage medium, wherein the processor is configured to execute the program to perform operations to:

perform Binary Phase Shift Keying (BPSK) mapping on a to-be-transmitted bit sequence to obtain a first sequence, wherein each element in the first sequence is 1 or −1, and lengths of both the bit sequence and the first sequence are N;

perform coding modulation on the first sequence based on a generator matrix or a first sub-matrix including some rows of the generator matrix, to obtain a symbol sequence $c_i$, wherein a length $m_i$ of the symbol sequence $c_i$ is a positive integer less than or equal to a maximum quantity M of transmission symbols, i is a transmission time of the symbol sequence, is a positive integer less than or equal to M, a quantity of columns of the generator matrix is N, a quantity of rows of the generator matrix is M, both M and N are positive integers, a location of a non-zero element in each row of the generator matrix is obtained based on a progressive edge-growth algorithm, values of the non-zero element in each row of the generator matrix are different and each are a weight value in a weight set, a value of a non-zero element in a first row of the generator matrix is the weight value randomly allocated in the weight set, and a value of a non-zero element in a row of the generator matrix other than the first row of the generator matrix is related to reference information of the non-zero element, and is in a negative correlation with an evaluation value corresponding to the reference information in the row of the generator matrix other than the first row; and send the symbol sequence $c_i$ to a receiving device;

wherein the reference information of the non-zero element in the row of the generator matrix other than the first row includes a quantity of other non-zero elements, values of the other non-zero elements, and/or a determined sequence number of a location of the non-zero element, wherein column sequence numbers of the other non-zero elements are the same as a column sequence number of the non-zero element in the row of the generator matrix other than the first row, and row sequence numbers of the other non-zero elements are smaller than a row sequence number of the non-zero element in the row of the generator matrix other than the first row.

14. The device according to claim 13, wherein the evaluation value is equal to the quantity of the other non-zero elements, or a sum of squares of the values of the other non-zero elements, or the determined sequence number.

15. The device according to claim 13, wherein a quantity of non-zero elements in each row of the generator matrix is a quantity d of weight values in the weight set.

16. The device according to claim 15, wherein the generator matrix includes P circulant permutation matrix groups, and the P circulant permutation matrix groups include d circulant permutation sub-matrices, wherein a quantity of rows of the d circulant permutation sub-matrices is equal to a quantity of columns of the d circulant permutation sub-matrices and is equal to a first ratio of N to d, P is equal to a second ratio of M to the first ratio, each row of the d circulant permutation sub-matrices has a non-zero element, the location of a non-zero element in the first row of the P circulant permutation matrix groups is obtained based on the progressive edge-growth algorithm, and the location of a non-zero element in a row of the d circulant permutation sub-matrices other than the first row of the d circulant permutation sub-matrices is obtained by performing cyclic shift based on a previous row of a row.

* * * * *